US012459720B2

(12) United States Patent
Conrad

(10) Patent No.: US 12,459,720 B2
(45) Date of Patent: Nov. 4, 2025

(54) NON-CYCLONIC MOMENTUM SEPARATOR AND A SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 179 days.

(21) Appl. No.: 18/348,562

(22) Filed: Jul. 7, 2023

(65) Prior Publication Data

US 2023/0348169 A1 Nov. 2, 2023

Related U.S. Application Data

(63) Continuation-in-part of application No. 18/311,157, filed on May 2, 2023, now Pat. No. 12,082,759, (Continued)

(51) Int. Cl.
*B65D 81/24* (2006.01)
*A01N 59/20* (2006.01)
*B65D 65/38* (2006.01)

(52) U.S. Cl.
CPC ............. *B65D 81/24* (2013.01); *A01N 59/20* (2013.01); *B65D 65/38* (2013.01)

(58) Field of Classification Search
CPC . A47L 5/24; A47L 7/0004; A47L 9/18; B65D 81/24; B65D 65/38; A01N 59/20
See application file for complete search history.

(56) References Cited

U.S. PATENT DOCUMENTS 3,543,325 A 12/1970 Hamrick
4,314,385 A 2/1982 Wimsatt et al.
(Continued)

FOREIGN PATENT DOCUMENTS

CA 978485 A1 11/1975
CA 2192906 A1 7/1997
(Continued)

OTHER PUBLICATIONS

U.S. Appl. No. 09/343,479, filed Jun. 30, 1999.
(Continued)

*Primary Examiner* — Andrew A Horton
(74) *Attorney, Agent, or Firm* — Philip C. Mendes da Costa; SMART & BIGGAR LP

(57) ABSTRACT

A surface cleaning apparatus includes a momentum separator, which includes an outer liquid collection chamber and an inner solid collection chamber that is positioned within the outer liquid collection chamber and separated from the outer liquid collection chamber by an inner chamber wall. At least a portion of the inner chamber wall is porous. The air flow path comprises an inlet conduit that extends from the dirty air inlet to the inner solid collection chamber, and a downstream air flow path extends from the inner solid collection chamber to a suction motor and the porous portion of the inner chamber wall connects the inner solid collection chamber in fluid communication with the downstream air flow path. Air travelling through the inlet conduit enters the inner solid collection chamber in a first flow direction and air exits the inner solid collection chamber is a second, different flow direction.

20 Claims, 16 Drawing Sheets

Related U.S. Application Data which is a continuation of application No. 17/944,646, filed on Sep. 14, 2022, now abandoned, and a continuation-in-part of application No. 17/726,640, filed on Apr. 22, 2022, now Pat. No. 11,980,334, said application No. 17/944,646 is a continuation of application No. 15/852,186, filed on Dec. 22, 2017, now Pat. No. 11,540,692, said application No. 17/726,640 is a continuation-in-part of application No. 15/852,186, filed on Dec. 22, 2017, now Pat. No. 11,540,692.

(60) Provisional application No. 62/559,151, filed on Sep. 15, 2017.

(56) References Cited

U.S. PATENT DOCUMENTS

| | | | |
|---|---|---|---|
| 5,135,552 | A | 8/1992 | Weistra |
| 5,168,599 | A | 12/1992 | Williams |
| 5,358,290 | A | 10/1994 | Fleet et al. |
| 5,377,383 | A | 1/1995 | Christensen |
| 5,500,979 | A | 3/1996 | Peter |
| 5,671,499 | A | 9/1997 | Melito et al. |
| 5,699,586 | A | 12/1997 | Melito et al. |
| 5,715,566 | A | 2/1998 | Weaver et al. |
| 5,765,258 | A | 6/1998 | Melito et al. |
| 5,909,755 | A | 6/1999 | Leal |
| 5,974,625 | A | 11/1999 | Garner |
| 6,012,200 | A | 1/2000 | Murphy et al. |
| 6,098,244 | A | 8/2000 | Conrad et al. |
| 6,099,661 | A | 8/2000 | Conrad |
| 6,101,672 | A | 8/2000 | Conrad et al. |
| 6,123,779 | A | 9/2000 | Conrad et al. |
| 6,129,775 | A | 10/2000 | Conrad et al. |
| 6,135,708 | A | 10/2000 | Conrad et al. |
| 6,168,716 | B1 | 1/2001 | Conrad et al. |
| 6,170,119 | B1 | 1/2001 | Conrad et al. |
| 6,173,474 | B1 | 1/2001 | Conrad |
| 6,174,127 | B1 | 1/2001 | Conrad et al. |
| 6,183,641 | B1 | 2/2001 | Conrad et al. |
| 6,221,134 | B1 | 4/2001 | Conrad et al. |
| 6,224,325 | B1 | 5/2001 | Conrad et al. |
| 6,224,656 | B1 | 5/2001 | Kawamoto |
| 6,231,645 | B1 | 5/2001 | Conrad et al. |
| 6,238,177 | B1 | 5/2001 | Conrad et al. |
| 6,243,917 | B1 | 6/2001 | Conrad |
| 6,251,296 | B1 | 6/2001 | Conrad et al. |
| 6,261,052 | B1 | 7/2001 | Conrad et al. |
| 6,261,379 | B1 | 7/2001 | Conrad et al. |
| 6,280,143 | B1 | 8/2001 | Parker et al. |
| 6,307,358 | B1 | 10/2001 | Conrad |
| 6,312,594 | B1 | 11/2001 | Conrad et al. |
| 6,317,920 | B1 | 11/2001 | Brickner et al. |
| 6,328,527 | B1 | 12/2001 | Conrad et al. |
| 6,334,234 | B1 | 1/2002 | Conrad et al. |
| 6,344,064 | B1 | 2/2002 | Conrad |
| 6,345,411 | B1 | 2/2002 | Kato et al. |
| 6,440,197 | B1 | 8/2002 | Conrad et al. |
| 6,442,792 | B1 | 9/2002 | Sudou et al. |
| 6,457,205 | B1 | 10/2002 | Conrad |
| 6,533,834 | B2 | 3/2003 | Conrad et al. |
| 6,596,044 | B1 | 7/2003 | Bilek et al. |
| 6,599,340 | B2 | 7/2003 | Conrad et al. |
| 6,782,585 | B1 | 8/2004 | Conrad et al. |
| 6,817,059 | B2 | 11/2004 | Tsuchiya et al. |
| D507,387 | S | 7/2005 | Jacobs |
| 7,013,528 | B2 | 3/2006 | Parker et al. |
| 7,222,393 | B2 | 5/2007 | Kaffenberger et al. |
| 7,247,181 | B2 | 7/2007 | Hansen et al. |
| 7,251,854 | B2 | 8/2007 | Gerth et al. |
| 7,329,294 | B2 | 2/2008 | Conrad |
| 7,473,289 | B2 | 1/2009 | Oh et al. |
| 7,740,675 | B2 | 6/2010 | Conrad |
| 7,749,293 | B2 | 7/2010 | Conrad |
| 7,776,120 | B2 | 8/2010 | Conrad |
| 7,803,207 | B2 | 9/2010 | Conrad |
| 7,811,345 | B2 | 10/2010 | Conrad |
| 7,867,308 | B2 | 1/2011 | Conrad |
| 7,887,613 | B2 | 2/2011 | Ruben |
| 7,941,895 | B2 | 5/2011 | Conrad |
| 7,996,957 | B2 | 8/2011 | Kah, Jr. |
| 8,020,251 | B2 | 9/2011 | Luebbering et al. |
| 8,127,398 | B2 | 3/2012 | Conrad |
| 8,146,201 | B2 | 4/2012 | Conrad |
| 8,151,407 | B2 | 4/2012 | Conrad |
| 8,176,596 | B2 | 5/2012 | Conrad |
| 8,192,515 | B2 | 6/2012 | Conrad |
| 8,268,029 | B2 | 9/2012 | Yoo |
| 8,292,979 | B2 | 10/2012 | Conrad |
| 8,296,900 | B2 | 10/2012 | Conrad |
| 8,349,428 | B2 | 1/2013 | Conrad |
| 8,370,993 | B2 | 2/2013 | Conrad |
| 8,375,508 | B2 | 2/2013 | Conrad |
| 8,448,291 | B2 | 5/2013 | Conrad |
| 8,479,358 | B2 | 7/2013 | Conrad |
| 8,486,170 | B2 | 7/2013 | Conrad et al. |
| 8,510,907 | B2 | 8/2013 | Conrad |
| 8,533,904 | B2 | 9/2013 | Conrad |
| 8,561,257 | B2 | 10/2013 | Conrad |
| 8,567,005 | B2 | 10/2013 | Conrad |
| 8,578,550 | B2 | 11/2013 | Conrad |
| 8,578,553 | B2 | 11/2013 | Conrad |
| 8,590,102 | B2 | 11/2013 | Conrad |
| 8,607,407 | B2 | 12/2013 | Conrad |
| 8,621,709 | B2 | 1/2014 | Conrad |
| 8,640,304 | B2 | 2/2014 | Conrad |
| 8,646,147 | B2 | 2/2014 | Conrad |
| 8,659,184 | B2 | 2/2014 | Conrad |
| 8,677,554 | B2 | 3/2014 | Conrad |
| 8,677,558 | B2 | 3/2014 | Conrad |
| 8,695,159 | B2 | 4/2014 | Van Der Kooi et al. |
| 8,707,510 | B2 | 4/2014 | Reed, Jr. |
| 8,713,751 | B2 | 5/2014 | Conrad |
| 8,813,305 | B2 | 8/2014 | Conrad |
| 8,834,209 | B2 | 9/2014 | Conrad |
| 8,850,654 | B2 | 10/2014 | Nolan et al. |
| 8,869,344 | B2 | 10/2014 | Conrad |
| 8,869,345 | B2 | 10/2014 | Conrad |
| 8,869,348 | B2 | 10/2014 | Conrad |
| 8,875,340 | B2 | 11/2014 | Conrad |
| 8,875,342 | B2 | 11/2014 | Conrad |
| 9,027,198 | B2 | 5/2015 | Conrad |
| 9,027,203 | B2 | 5/2015 | Conrad et al. |
| 9,066,642 | B2 | 6/2015 | Conrad |
| 9,119,511 | B2 | 9/2015 | Kah, Jr. |
| 9,119,513 | B2 | 9/2015 | Conrad |
| 9,161,666 | B2 | 10/2015 | Conrad |
| 9,161,669 | B2 | 10/2015 | Conrad |
| 9,167,944 | B2 | 10/2015 | Conrad |
| 9,204,769 | B2 | 12/2015 | Conrad |
| 9,204,773 | B2 | 12/2015 | Conrad |
| 9,215,960 | B2 | 12/2015 | Conrad |
| 9,226,633 | B2 | 1/2016 | Conrad et al. |
| 9,227,151 | B2 | 1/2016 | Conrad |
| 9,227,201 | B2 | 1/2016 | Conrad |
| 9,232,881 | B2 | 1/2016 | Conrad |
| 9,238,235 | B2 | 1/2016 | Conrad |
| 9,295,363 | B1 | 3/2016 | Conrad |
| 9,295,995 | B2 | 3/2016 | Conrad |
| 9,314,138 | B2 | 4/2016 | Conrad |
| 9,314,139 | B2 | 4/2016 | Conrad et al. |
| 9,320,401 | B2 | 4/2016 | Conrad |
| 9,326,652 | B2 | 5/2016 | Conrad |
| 9,364,127 | B2 | 6/2016 | Conrad |
| 9,427,122 | B2 | 8/2016 | Conrad et al. |
| 9,427,126 | B2 | 8/2016 | Conrad |
| 9,433,332 | B2 | 9/2016 | Conrad |
| 9,451,852 | B2 | 9/2016 | Conrad |
| 9,451,855 | B2 | 9/2016 | Conrad |
| 9,456,721 | B2 | 10/2016 | Conrad |
| 9,492,045 | B2 | 11/2016 | Conrad |
| 9,526,394 | B2 | 12/2016 | Conrad |
| 9,572,463 | B2 | 2/2017 | Conrad |
| 9,591,952 | B2 | 3/2017 | Conrad |

(56) References Cited

U.S. PATENT DOCUMENTS

| | | | |
|---|---|---|---|
| 9,591,958 | B2 | 3/2017 | Conrad |
| 9,668,630 | B2 | 6/2017 | Conrad |
| 9,775,484 | B2 | 10/2017 | Conrad |
| 9,801,513 | B2 | 10/2017 | Conrad et al. |
| 9,820,621 | B2 | 11/2017 | Conrad et al. |
| 10,076,183 | B2 | 9/2018 | Conrad et al. |
| 10,149,587 | B2 | 12/2018 | Conrad et al. |
| 10,159,393 | B2 | 12/2018 | Conrad |
| 10,201,260 | B2 | 2/2019 | Conrad et al. |
| 10,214,349 | B2 | 2/2019 | Conrad |
| 10,251,519 | B2 | 4/2019 | Conrad |
| 10,357,136 | B2 | 7/2019 | Conrad |
| 10,537,216 | B2 | 1/2020 | Conrad |
| 10,537,219 | B2 | 1/2020 | Conrad et al. |
| 10,568,477 | B2 | 2/2020 | Conrad |
| 10,575,693 | B2 | 3/2020 | Conrad |
| 10,667,663 | B2 | 6/2020 | Conrad |
| 10,687,679 | B2 | 6/2020 | Conrad et al. |
| 10,729,294 | B2 | 8/2020 | Conrad et al. |
| 10,791,890 | B2 | 10/2020 | Conrad |
| 10,791,896 | B2 | 10/2020 | Conrad |
| 10,888,205 | B2 | 1/2021 | Conrad et al. |
| 10,932,634 | B2 | 3/2021 | Conrad |
| 10,959,588 | B2 | 3/2021 | Conrad et al. |
| 11,013,378 | B2 | 5/2021 | Conrad |
| 11,108,254 | B2 | 8/2021 | Conrad |
| 11,135,602 | B2 | 10/2021 | Conrad |
| 11,154,169 | B2 | 10/2021 | Conrad |
| 11,198,085 | B2 | 12/2021 | Conrad et al. |
| 11,213,179 | B2 | 1/2022 | Conrad |
| 11,246,462 | B2 | 2/2022 | Conrad |
| 11,285,495 | B2 | 3/2022 | Conrad |
| 11,318,482 | B2 | 5/2022 | Conrad |
| 11,478,116 | B2 | 10/2022 | Conrad |
| 11,478,117 | B2 | 10/2022 | Conrad et al. |
| 11,529,034 | B2 | 12/2022 | Conrad |
| 11,534,041 | B2 | 12/2022 | Conrad |
| 11,534,043 | B2 | 12/2022 | Conrad |
| 11,534,702 | B2 | 12/2022 | Conrad |
| 11,547,258 | B2 | 1/2023 | Conrad |
| 11,571,097 | B2 | 2/2023 | Conrad |
| 11,612,290 | B2 | 3/2023 | Conrad |
| 11,641,995 | B2 | 5/2023 | Conrad |
| 11,707,170 | B2 | 7/2023 | Conrad |
| 11,737,625 | B2 | 8/2023 | Conrad |
| 11,745,131 | B2 | 9/2023 | Conrad |
| 11,793,374 | B2 | 10/2023 | Conrad |
| 11,839,343 | B2 | 12/2023 | Conrad et al. |
| 11,841,024 | B2 | 12/2023 | Conrad |
| 11,857,142 | B2 | 1/2024 | Conrad |
| 11,950,745 | B2 | 4/2024 | Conrad et al. |
| 12,053,143 | B2 | 8/2024 | Conrad |
| 12,075,966 | B2 | 9/2024 | Conrad |
| 2001/0027587 | A1 | 10/2001 | Conrad et al. |
| 2002/0042965 | A1 | 4/2002 | Salem et al. |
| 2002/0129460 | A1 | 9/2002 | Roney et al. |
| 2002/0162188 | A1 | 11/2002 | Harmen |
| 2003/0159230 | A1 | 8/2003 | Oh |
| 2003/0201754 | A1 | 10/2003 | Conrad |
| 2004/0103496 | A1 | 6/2004 | Worwag |
| 2004/0134026 | A1 | 7/2004 | Brinkhoff et al. |
| 2004/0216266 | A1 | 11/2004 | Conrad |
| 2005/0091783 | A1 | 5/2005 | Sepke et al. |
| 2005/0115409 | A1 | 6/2005 | Conrad |
| 2006/0090285 | A1 | 5/2006 | Lee et al. |
| 2006/0156509 | A1 | 7/2006 | Luebbering et al. |
| 2006/0196004 | A1 | 9/2006 | Conrad |
| 2006/0288520 | A1 | 12/2006 | Oh |
| 2008/0172992 | A1 | 7/2008 | Conrad |
| 2008/0178416 | A1 | 7/2008 | Conrad |
| 2008/0178418 | A1 | 7/2008 | Conrad |
| 2008/0178420 | A1 | 7/2008 | Conrad |
| 2008/0179133 | A1 | 7/2008 | Conrad |
| 2008/0196366 | A1 | 8/2008 | Conrad |
| 2008/0209669 | A1 | 9/2008 | Kah |
| 2008/0216281 | A1 | 9/2008 | Conrad |
| 2008/0263813 | A1 | 10/2008 | Han et al. |
| 2009/0056060 | A1 | 3/2009 | Han et al. |
| 2010/0175217 | A1 | 7/2010 | Conrad |
| 2010/0229323 | A1 | 9/2010 | Conrad |
| 2010/0229325 | A1 | 9/2010 | Conrad |
| 2010/0229326 | A1 | 9/2010 | Conrad |
| 2010/0229334 | A1 | 9/2010 | Conrad |
| 2010/0229335 | A1 | 9/2010 | Conrad |
| 2010/0229337 | A1 | 9/2010 | Conrad |
| 2010/0251507 | A1 | 10/2010 | Conrad |
| 2011/0079248 | A1 | 4/2011 | Huffman et al. |
| 2011/0219567 | A1 | 9/2011 | Conrad |
| 2011/0219579 | A1 | 9/2011 | Conrad |
| 2011/0296648 | A1 | 12/2011 | Kah, Jr. |
| 2012/0266408 | A1 | 10/2012 | Van Der Kooi et al. |
| 2013/0291333 | A1 | 11/2013 | Grey |
| 2014/0059983 | A1 | 3/2014 | Ho |
| 2014/0165313 | A1 | 6/2014 | Hicke |
| 2014/0237753 | A1 | 8/2014 | Conrad |
| 2014/0237762 | A1 | 8/2014 | Conrad |
| 2014/0237768 | A1 | 8/2014 | Conrad |
| 2014/0245564 | A1 | 9/2014 | Conrad |
| 2014/0373307 | A1 | 12/2014 | Van Der Kooi et al. |
| 2015/0135474 | A1 | 5/2015 | Gidwell |
| 2016/0174791 | A1 | 6/2016 | Conrad |
| 2016/0174797 | A1 | 6/2016 | Conrad |
| 2017/0119225 | A1 | 5/2017 | Xia et al. |
| 2018/0140155 | A1 | 5/2018 | Mitchell et al. |
| 2018/0249871 | A1 | 9/2018 | Rukavina et al. |
| 2019/0082922 | A1 | 3/2019 | Conrad et al. |
| 2019/0282051 | A1* | 9/2019 | Conrad ................. A47L 9/1608 |
| 2019/0320861 | A1 | 10/2019 | Conrad |
| 2020/0305671 | A1 | 10/2020 | Conrad |
| 2021/0228032 | A1 | 7/2021 | Conrad |
| 2021/0330157 | A1 | 10/2021 | Conrad |
| 2021/0386258 | A1 | 12/2021 | Conrad |
| 2022/0142440 | A1 | 5/2022 | Conrad |
| 2022/0151446 | A1 | 5/2022 | Conrad et al. |
| 2022/0211233 | A1 | 7/2022 | Conrad |
| 2023/0098664 | A1 | 3/2023 | Conrad |
| 2023/0165418 | A1 | 6/2023 | Braendle |
| 2023/0263350 | A1 | 8/2023 | Conrad et al. |
| 2023/0348169 | A1 | 11/2023 | Conrad |
| 2024/0008701 | A1 | 1/2024 | Conrad et al. |
| 2024/0016351 | A1 | 1/2024 | Conrad |
| 2024/0138634 | A1 | 5/2024 | Conrad |
| 2024/0180373 | A1 | 6/2024 | Conrad et al. |
| 2024/0245271 | A1 | 7/2024 | Conrad |
| 2024/0358212 | A1 | 10/2024 | Conrad |

FOREIGN PATENT DOCUMENTS

| | | | |
|---|---|---|---|
| CA | 2275675 | A1 | 12/1999 |
| CA | 2276796 | A1 | 1/2000 |
| CA | 2288544 | A1 | 5/2000 |
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2330801 | A1 | 7/2001 |
| CA | 2374961 | A1 | 11/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2391177 | A1 | 12/2002 |
| CA | 2391180 | A1 | 12/2002 |
| CA | 2192883 | C | 2/2005 |
| CA | 2192909 | C | 2/2005 |
| CA | 2603508 | A1 | 10/2006 |
| CA | 2706562 | A1 | 5/2009 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658397 | A1 | 9/2010 |

(56) References Cited

FOREIGN PATENT DOCUMENTS

| | | | |
|---|---|---|---|
| CA | 2658497 | A1 | 9/2010 |
| CA | 2658643 | A1 | 9/2010 |
| CA | 2658644 | A1 | 9/2010 |
| CA | 2806339 | A1 | 2/2012 |
| CA | 2821234 | A1 | 6/2012 |
| CA | 3227758 | A1 | 6/2023 |
| CN | 1212095 | C | 7/2005 |
| CN | 109846419 | A | 6/2019 |
| CN | 113243839 | A | 8/2021 |
| CN | 113331731 | A | 9/2021 |
| CN | 115444307 | A | 12/2022 |
| DE | 102004030350 | A1 | 1/2006 |
| EP | 1274337 | A2 | 1/2003 |
| EP | 2294961 | A2 | 3/2011 |
| EP | 1707094 | B1 | 4/2012 |
| GB | 539973 | A | 10/1941 |
| GB | 2476812 | B | 1/2014 |
| GB | 2522658 | B | 4/2016 |
| WO | 0010718 | A1 | 3/2000 |
| WO | 2023051254 | A1 | 4/2023 |

OTHER PUBLICATIONS

English machine translation of CN109846419A, published on Jun. 7, 2019.

English machine translation of CN1212095C, published on Jul. 27, 2005.

English machine translation of DE102004030350, published on Jan. 12, 2006.

English machine translation of the Abstract of CN1212095, published on Jul. 27, 2005.

English machine translation of WO2023051254, published on Apr. 6, 2023.

English machine translation of CN115444307A1, published on Dec. 9, 2022.

English machine translation of CN113331731A, published on Sep. 3, 2021.

English machine translation of CN113243839A, published on Aug. 13, 2021.

International Search Report and Written Opinion, received in connection to International Patent Application No. PCT/CA2024/050859, mailed on Oct. 18, 2024.

* cited by examiner

NON-CYCLONIC MOMENTUM SEPARATOR AND A SURFACE CLEANING APPARATUS

CROSS REFERENCE TO RELATED APPLICATIONS

This application is:

(1) a continuation-in-part of U.S. patent application Ser. No. 17/726,640, which was filed on Apr. 22, 2022, which itself is a continuation-in-part of U.S. patent application Ser. No. 15/852,186, which was filed on Dec. 22, 2017 and issued as U.S. Pat. No. 11,540,692 on Jan. 3, 2023, which itself claims priority from U.S. Provisional Application No. 62/559,151, filed on Sep. 15, 2017, and a continuation-in-part of U.S. patent application Ser. No. 18/311,157, which was filed on May 2, 2023, which itself is a continuation of U.S. patent application Ser. No. 17/994,646, which was filed on Nov. 28, 2022 and which is allowed, which itself is a continuation of U.S. patent application Ser. No. 15/852,186 which was filed on Dec. 22, 2017 and which issued as U.S. Pat. No. 11,540,692 on Jan. 3, 2023, which claims the benefit of U.S. Provisional Application No. 62/559,151 on Sep. 15, 2017, the disclosure of each of which is incorporated herein by reference.

FIELD

This disclosure relates generally to surface cleaning apparatus, and particularly to surface cleaning apparatus which may be used for wet/dry cleaning.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuum cleaners. Further, various designs for cyclonic surface cleaning apparatus, including battery operated cyclonic hand vacuum cleaners are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, which may be used alone or in combination with any one or more other aspects, a surface cleaning apparatus includes an air flow path which includes at least one dirt separation member, such as a momentum separator or cyclone, and an air moving member, such as a motor and fan assembly, whereby dirt is removed from an air stream as it travels from a dirty air inlet to a clean air outlet. The surface cleaning apparatus, which is a wet/dry vacuum, includes a separated material collection region for collecting liquid and solid separated material. The separated material collection region is a divided region, divided into a solids collection chamber and a liquids collection chamber. The separated material collection region is divided by a porous barrier to allow liquids to flow from the solids collection region to the liquids collection region. The solids collection chamber may be an internal chamber within, optionally suspended within, the liquids collection chamber.

In accordance with this aspect, there is provided a surface cleaning apparatus comprising:

(a) an air flow path from a dirty air inlet to a clean air outlet;

(b) a momentum separator positioned downstream of the dirty air inlet, the momentum separator comprising an outer liquid collection chamber and an inner solid collection chamber that is positioned within the outer liquid collection chamber; and, (c) a suction motor positioned downstream from the momentum separator, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, and wherein a downstream air flow path extends from the inner solid collection chamber to the suction motor and the porous portion of the inner chamber wall connects the inner solid collection chamber in fluid communication with the downstream air flow path, and wherein air travelling through the inlet conduit enters the inner solid collection chamber in a first flow direction and air exits the inner solid collection chamber is a second flow direction that is different to the first flow direction.

In accordance with another aspect of this disclosure, which may be used alone or in combination with any one or more other aspects, an opening into the separated material collection region is shaped and/or positioned to inhibit liquid exit. The opening, which may be referred to as a collection region flow opening, is an opening that is open while the surface cleaning apparatus is in use. The opening may be, e.g., an opening through which material is introduced to the separated material collection region, such as an outlet from a separate air treatment chamber or an air inlet of an air treatment chamber if the separated material collection region is an internal region in the air treatment chamber. If the separated material collection region is an internal region in the air treatment chamber, the air outlet of the air treatment chamber is also a collection region flow opening shaped and/or positioned to inhibit liquid exit. The collection region flow opening may be arranged towards an upper and/or rearward end of the chamber, optionally spaced by at least half the length from the front and/or at least half the height from the bottom of the chamber. The collection region flow opening may be an opening at an inner end of an inwardly projecting conduit extending into the chamber such that liquids may gather against a wall from which the conduit projects.

In accordance with this aspect, there is provided a hand surface cleaning apparatus comprising:

(a) an air flow path from a dirty air inlet to a clean air outlet wherein the dirty air inlet is provided at a front end of the hand surface cleaning apparatus;

(b) a momentum separator positioned downstream of the dirty air inlet, the momentum separator comprising an outer liquid collection chamber and an inner solid collection chamber that is positioned within the outer liquid collection chamber; and, (c) a suction motor positioned downstream from the momentum separator and rearward of the dirty air inlet, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, and wherein a downstream air flow path extends from the inner solid collection chamber to the suction motor and the porous portion of the inner chamber wall connects the inner solid collection chamber in fluid communication with the downstream air flow path, and wherein the outer liquid collection chamber has a length in a forward/rearward direction and an outlet of the inlet conduit is positioned rearward of the middle of the length.

In accordance with another aspect of this disclosure, which may be used alone or in combination with any one or more other aspects, the division of the separated material collection region is adjustable. The porous member dividing the chamber into a solids collection chamber and a liquids collection chamber may be repositionable to change how the chamber is divided.

In accordance with this aspect, there is provided a surface cleaning apparatus comprising:

(a) an air flow path from a dirty air inlet to a clean air outlet;

(b) a momentum separator positioned downstream of the dirty air inlet, the momentum separator comprising a liquid collection chamber and a solid collection chamber; and, (c) a suction motor positioned downstream from the momentum separator, wherein the solid collection chamber is separated from the liquid collection chamber by a chamber wall, and at least a portion of the chamber wall comprises a porous portion and connects the solid collection chamber in fluid communication with the liquid collection chamber, and wherein the liquid collection chamber has a facing wall that faces the porous portion, the porous portion is moveable with respect to the facing wall between a first operating position in which the liquid collection chamber has a first volume and the surface cleaning apparatus is operable to clean a surface, and a second operating position in which the liquid collection chamber has a first volume and the surface cleaning apparatus is operable to clean the surface, wherein the second volume is larger than the first volume.

In accordance with another aspect of this disclosure, which may be used alone or in combination with any one or more other aspects, the separated material collection region is in the air flow path. The region is an internal region of an air treatment member, such as a non-cyclonic momentum separator. The air inlet and air outlet of the air treatment member open into the separated material collection region. The air inlet opens into the solids collection chamber, and the air inlet may extend through the liquids collection chamber to open into the solids collection chamber. The air outlet may open from the liquids collection region and/or be separated from the solids collection region by the permeable barrier. The air inlet and air outlet are each collection region flow openings shaped and/or positioned to inhibit liquid exit.

In accordance with this aspect, there is provided an upright surface cleaning apparatus comprising:

(a) an air flow path from a dirty air inlet to a clean air outlet with a motor and fan assembly positioned in the air flow path;

(b) a surface cleaning head having the dirty air inlet;

(c) an upright section moveable mounted to the surface cleaning head between an upright storage position and a reclined operating position, the upright section comprising an air treatment assembly;

(d) the air treatment assembly comprising an air treatment chamber positioned downstream of the dirty air inlet, the air treatment chamber comprising an air treatment chamber air inlet, an air treatment chamber air outlet and a separated material outlet; and, (e) the air treatment assembly further comprises a separated material collection chamber comprising a solid collection region and a liquid collection region, wherein, when the upright section is in the storage position, the solid collection region is positioned below the air treatment chamber and the liquid collection region is positioned below the solid collection region and the liquid collection region is in communication with the solid collection region through a porous member.

In accordance with another aspect of this disclosure, which may be used alone or in combination with any one or more other aspects, the separated material collection region is not in the air flow path. The separated material collection region is in communication with an air treatment member via a separated material outlet, to receive separated material that has been separated in the air treatment member. The separated material outlet opens into the solids collection chamber. The air treatment member may be a cyclone, and the air treatment member may overly the solids collection chamber. The air treatment member may be above or directly above the solids collection chamber.

In accordance with another aspect of this disclosure, which may be used alone or in combination with any one or more other aspects, the inner chamber wall separating the solids collection chamber from the liquids collection chamber includes one or more impermeable portions. The portions are impermeable to air and/or water. The impermeable portions are arranged force a redirection of a flow of air and/or water within the collection chamber between the inlet or outlet and the inner chamber wall, to impede the flow from driving solids through the inner chamber wall.

In accordance with this aspect, there is provided a surface cleaning apparatus comprising:

(a) an air flow path from a dirty air inlet to a clean air outlet with a motor and fan assembly positioned in the air flow path;

(b) an air treatment chamber positioned downstream of the dirty air inlet, the air treatment chamber comprising an air treatment chamber air inlet, an air treatment chamber air outlet and a separated material outlet; and, (c) a separated material collection chamber comprising a solid collection region and a liquid collection region, wherein, when the surface cleaning apparatus is in operation to clean a surface, the air treatment chamber air inlet is provided at an upper end of the air treatment chamber and the air treatment chamber air outlet comprises a baffle plate that extends generally transversely to a direction of flow through the air treatment chamber air outlet.

In accordance with another aspect of this disclosure, which may be used alone or in combination with any one or more other aspects, at least one of the solids collection chamber and the liquids collection chamber is selectively openable while the other remains closed. Separately openable collection chambers allows a user to dispose of one type of material at a time. The liquids collection chamber may be selectively openable while the solids collection chamber remains closed, to permit a user to dump out the liquids while the solids remain contained in the surface cleaning apparatus. In some examples, a separate air treatment chamber is also selectively openable for dumping material that is retained in the air treatment chamber. The air treatment chamber may be openable while the solids and liquids collection chambers remain closed, or may be openable concurrently with one of the solids and liquids collection chambers. The air treatment chamber may be concurrently openable with the solids collection chamber.

In accordance with this aspect, there is provided a surface cleaning apparatus comprising:

(a) an air flow path from a dirty air inlet to a clean air outlet;

(b) a momentum separator positioned downstream of the dirty air inlet, the momentum separator comprising an outer liquid collection chamber and an inner solid collection chamber that is positioned within the outer liquid collection chamber; and, (c) a suction motor positioned downstream from the momentum separator, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, and wherein a downstream air flow path extends from the inner solid collection chamber to the suction motor and the porous portion of the inner chamber wall connects the inner solid collection chamber in fluid communication with the downstream air flow path, and wherein the inner solid collection chamber and the outer liquid collection chamber are separately openable.

In accordance with this aspect, there is also provided a surface cleaning apparatus comprising:

(a) an air flow path from a dirty air inlet to a clean air outlet with a motor and fan assembly positioned in the air flow path;

(b) an air treatment chamber positioned downstream of the dirty air inlet, the air treatment chamber comprising an air treatment chamber air inlet, an air treatment chamber air outlet and a separated material outlet; and, (c) a separated material collection chamber comprising a solid collection region and a liquid collection region, the liquid collection region is in communication with the solid collection region through a porous member, wherein material separated in the air treatment chamber enters the solid collection region through the separated material outlet and liquid that is part of the material separated in the air treatment chamber enters the liquid collection region through the porous member.

In accordance with another aspect of this disclosure, which may be used alone or in combination with any one or more other aspects, the surface cleaning apparatus includes an impact surface downstream of an outlet port of the air flow path to encourage material separation. The outlet port is an outlet port of an air outlet of an air treatment chamber. The impact surface may be a recessed surface to inhibit movement of separated material across the surface and off an edge of the surface in a downstream air flow. The impact surface may be a surface of a baffle plate. The baffle plate may include an opposed surface facing a downstream air inlet port, such as a port opening into a pre-motor filter chamber, to redirect an air flow around the baffle plate.

In accordance with this aspect, there is provided a surface cleaning apparatus comprising:

(a) an air flow path from a dirty air inlet to a clean air outlet with a motor and fan assembly positioned in the air flow path;

(b) an air treatment chamber positioned downstream of the dirty air inlet, the air treatment chamber comprising an air treatment chamber air inlet, an air treatment chamber air outlet and a separated material outlet; and, (c) a separated material collection chamber comprising a solid collection region and a liquid collection region, wherein, when the surface cleaning apparatus is in operation to clean a surface, the air treatment chamber air inlet is provided at an upper end of the air treatment chamber and the air treatment chamber air outlet comprises a baffle plate that extends generally transversely to a direction of flow through the air treatment chamber air outlet.

In accordance with another aspect of this disclosure, which may be used alone or in combination with any one or more other aspects, a junction between separable portions of a chamber is shielded, such as by a wall portion overlying the junction. The junction is shielded to inhibit air or separated material from being driven through the junction, and the junction may be in the path of air flow exiting an air inlet of an air treatment chamber. The shielded junction may be across from and/or facing an inlet port of an air treatment chamber.

In accordance with this aspect, there is provided a surface cleaning apparatus comprising:

(a) an air flow path from a dirty air inlet to a clean air outlet with a suction motor positioned in the air flow path; and, (b) an air treatment chamber positioned downstream of the dirty air inlet, the air treatment chamber having an air treatment chamber air inlet and an air treatment chamber air outlet, wherein the air treatment chamber has a first portion and a second portion, the second portion is moveable between a closed position and an open emptying position, wherein, when the second portion is in the closed position, the first portion and the second portion abut along a juncture and a wall member is positioned in the air treatment chamber overlying the juncture.

In accordance with another aspect of this disclosure, which may be used alone or in combination with any one or more other aspects, an accessory includes a plurality of inlet nozzles. The inlet nozzles may be intended to draw different types of material, and the inlet nozzles are arranged to be sequentially applied to a surface that is being cleaned. The inlet nozzles may be separated by a brush roll.

In accordance with this aspect, there is provided a surface cleaning head for a surface cleaning apparatus having a front end, a rear end, an upper end and a lower end, the lower end comprising a cleaning member, a first dirty air inlet positioned forward of the cleaning member and a second dirty air inlet positioned rearward of the cleaning member.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
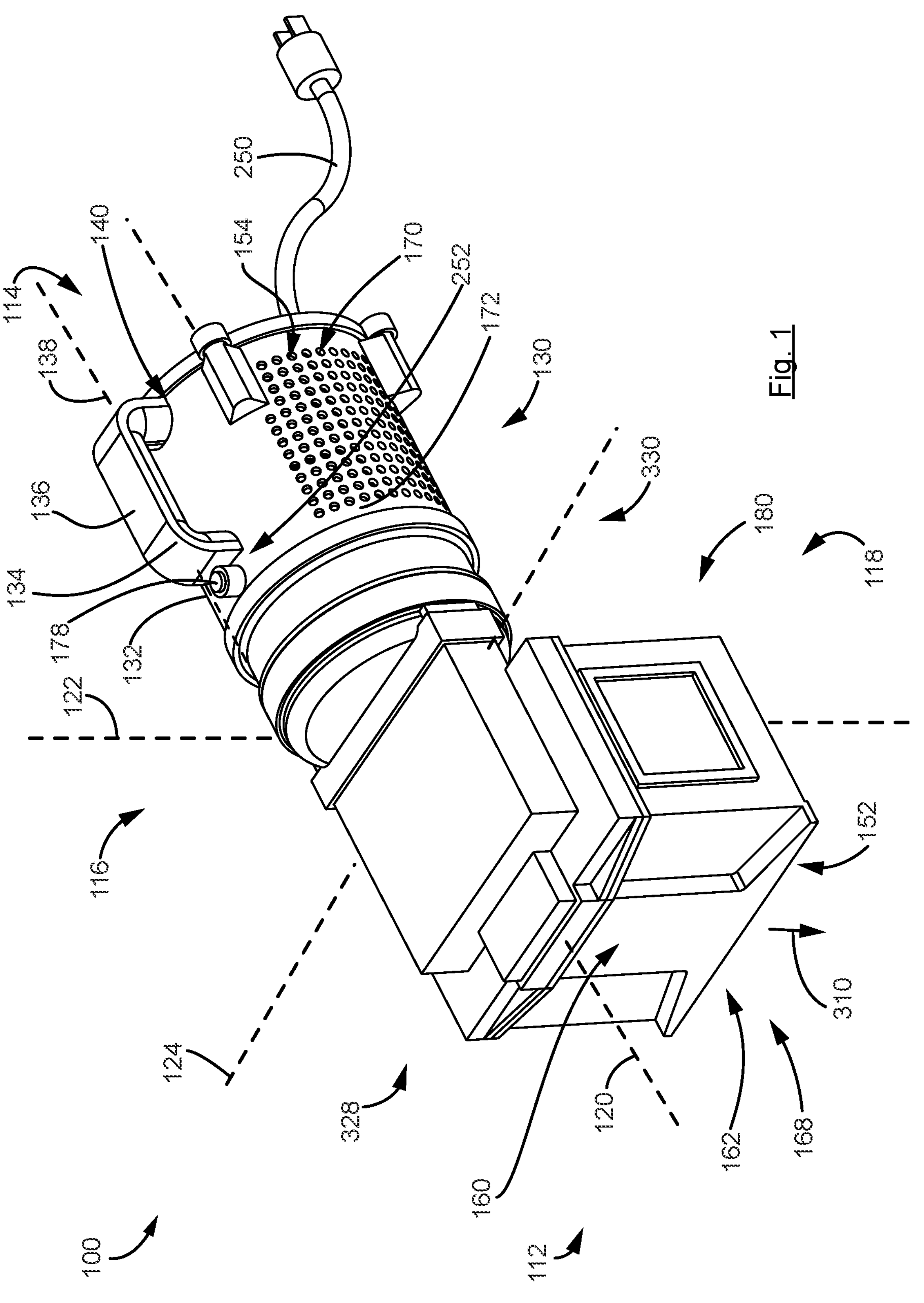
FIG. 1 is a top, front perspective view of a first surface cleaning apparatus, according to an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Surface Cleaning Apparatus

Figure 2:
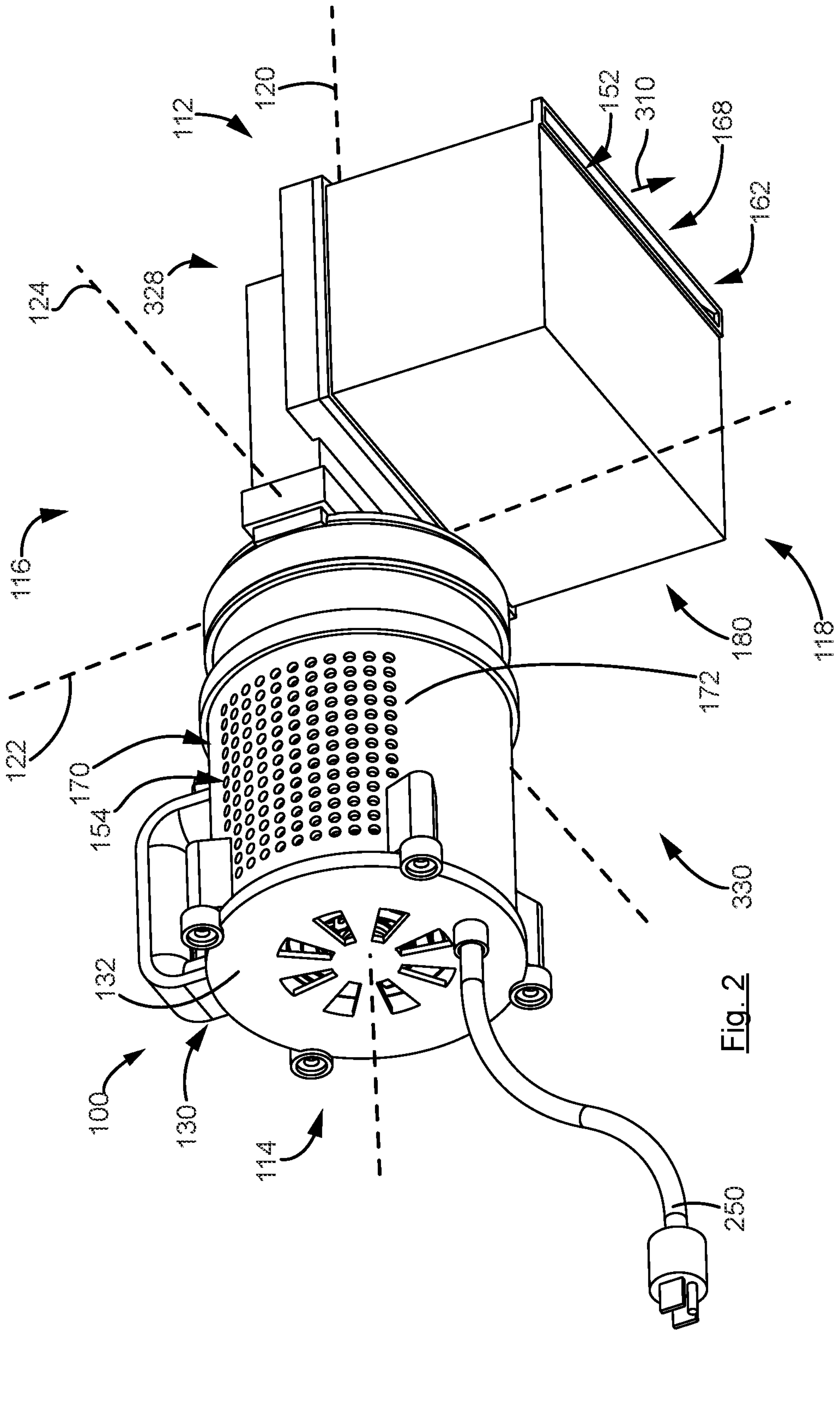
FIG. 2 is a bottom, rear perspective view of the surface cleaning apparatus of FIG. 1.

Referring to FIGS. 1 and 2, an exemplary embodiment of a surface cleaning apparatus is shown generally as 100. The illustrated example surface cleaning apparatus 100 of FIGS. 1 and 2 is a hand-held surface cleaning apparatus, which is commonly referred to as a "hand vacuum cleaner" or a "handvac". As used herein, a hand-held surface cleaning apparatus or hand vacuum cleaner or handvac is a vacuum cleaner that can be operated generally one-handedly to clean a surface while its weight is held by the same one hand. For example, the carry handle and a clean air inlet may be rigidly coupled to each other (directly or indirectly) so as to move as one while maintaining a constant orientation relative to each other. This is contrasted with upright and canister surface cleaning apparatus, the weight of which is supported by a surface (e.g., a floor below) during use. Optionally, a hand surface cleaning apparatus 100 may be removably mountable on a base so as to form, for example, an upright vacuum cleaner, a canister vacuum cleaner, a stick vacuum cleaner or stick vac (see for example FIG. 6), a wet-dry vacuum cleaner and the like. As exemplified in FIG. 1, the base 102 may include, e.g., a surface cleaning head 104 and an elongated wand 106 that can be removably connectable to the surface cleaning apparatus 100.

Figure 11:
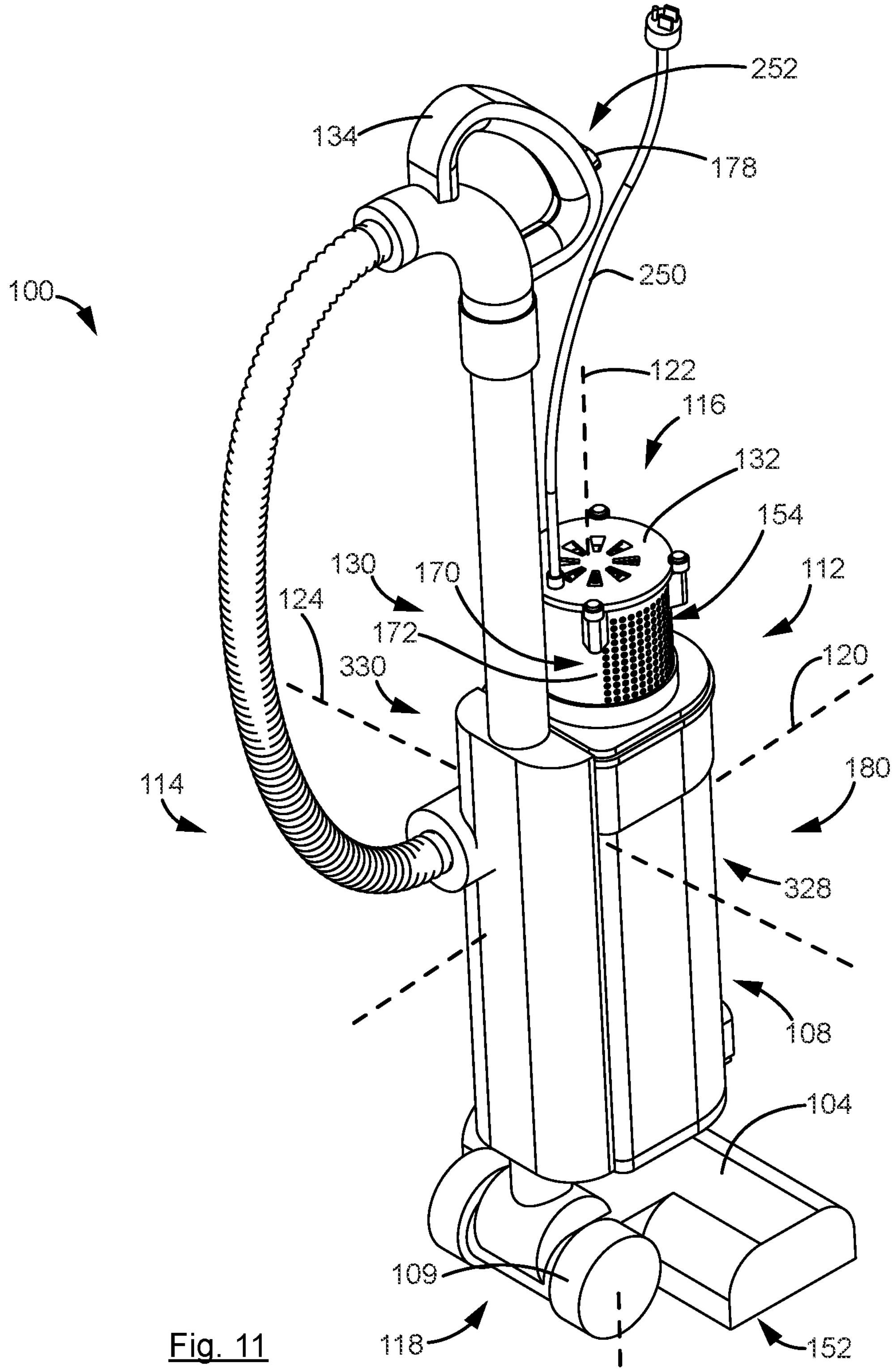
FIG. 11 is a top, rear perspective view of a third surface cleaning apparatus, according to an embodiment.
Figure 12:
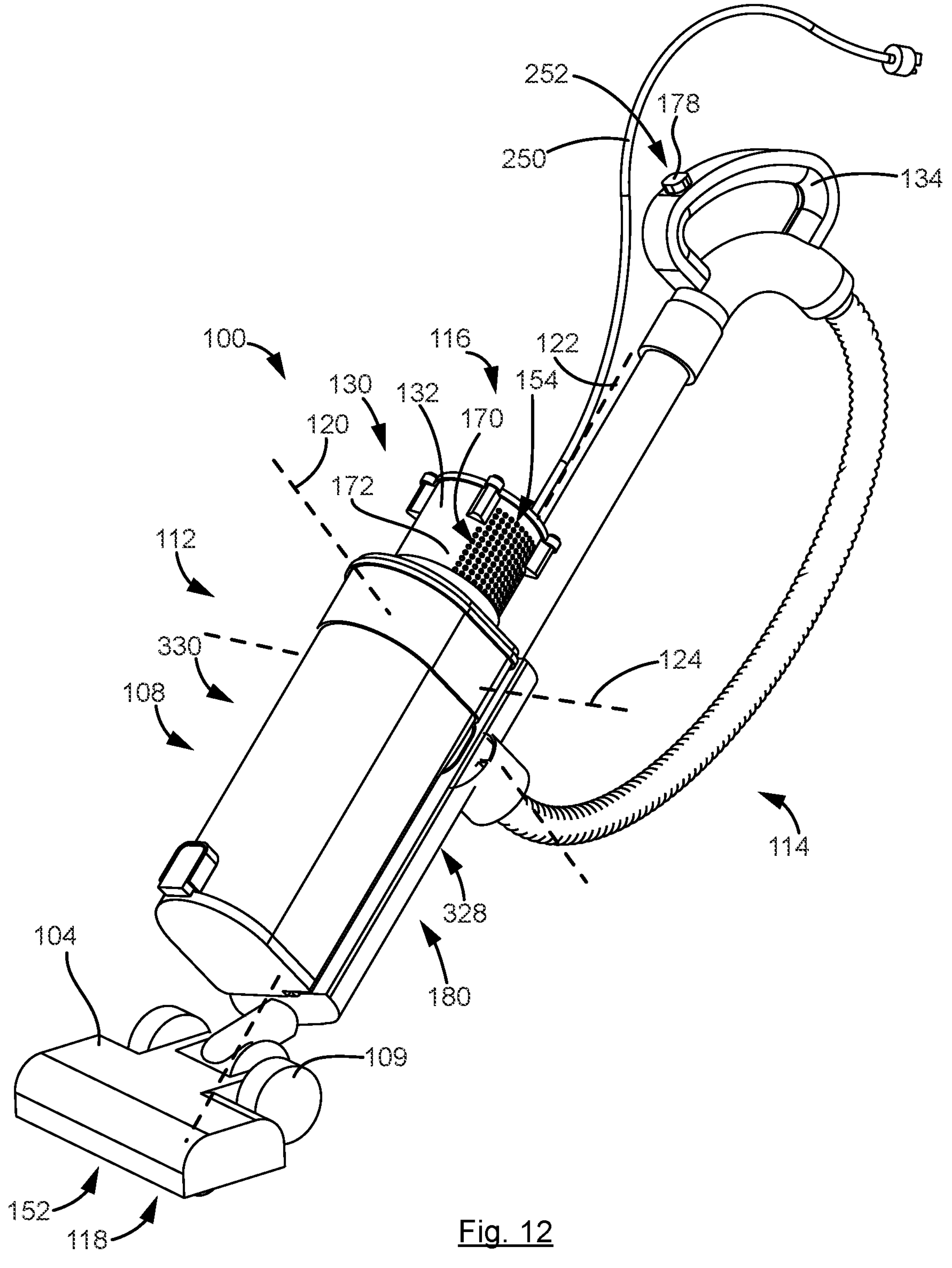
FIG. 12 is a bottom, front perspective view of the surface cleaning apparatus of FIG. 11.

In some embodiments, as exemplified in FIGS. 11 and 12, the surface cleaning apparatus 100 may be an upright vacuum cleaner. An upright vacuum cleaner includes the surface cleaning head 104 and an upright section 108 mounted to the surface cleaning head 104 and moveable between an upright storage position (FIG. 11) and a reclined operating position (FIG. 12). In some examples, a surface cleaning apparatus 100 includes wheels 109 for, e.g., supporting the main body 130 (e.g., a canister vacuum) and/or an air treatment assembly 100 or a surface cleaning head 104 thereof (e.g., an upright or stick vacuum) above a floor or other support surface. As exemplified, a wheel or wheels may be mounted to a main body 130 and/or surface cleaning head 104. Wheeled support reduces the weight that must be supported by a user, which may be particularly helpful when the vacuum is a large-capacity vacuum that can contain a substantial weight of separated material (e.g., dirt or liquid), such as more than 3 kg, more than 5 kg, more than 10 kg, or more than 15 kg of separated material.

It will be appreciated that any one or more of the features of the surface cleaning apparatus 100 set out herein may also or alternately be used in any type of surface cleaning apparatus, such as an upright surface cleaning apparatus, a stick vac, an extractor, or the like. It will also be appreciated that a surface cleaning apparatus may use any configuration of the operating components and the airflow paths exemplified herein.

It will be appreciated that the solid and liquid collection chambers discussed herein may be used in a surface cleaning apparatus which is used only as an extractor or in a vacuum cleaner which is operable (concurrently or alternately) to both collect water and also to clean a surface (e.g., clean a carpet or a hardwood floor which is typically the function of a vacuum cleaner). It will also be appreciated that the solid and liquid collection chambers discussed herein may be an auxiliary cleaning tool that may be attached to any surface cleaning apparatus.

As exemplified in FIGS. 1 and 2, wherein the surface cleaning apparatus is in an in use position and also in an orientation is which it may be positioned on a table, the surface cleaning apparatus 100 has an apparatus front end 112, an apparatus rear end 114, an apparatus upper end 116 and an apparatus lower end 118. An apparatus longitudinal axis 120 extends between the apparatus front end 112 and the apparatus rear end 114 in a forward/rearward direction. An apparatus vertical axis 122 extends between the apparatus upper end 106 and apparatus lower end 118 in an upward/downward direction. The apparatus vertical axis 122 is perpendicular to the apparatus longitudinal axis 120. An apparatus transverse axis 124 is perpendicular to each of the apparatus vertical axis 122 and the apparatus longitudinal axis 120 and extends laterally through the right and left lateral sides of apparatus 100.

The surface cleaning apparatus 100 includes a main body 130. The main body 130 includes a main body housing 132 and a carry handle 134. It will be appreciated that the main body housing 132 houses one or more of a pre-motor filter, an air moving member (e.g., a suction motor), and a post motor filter. As exemplified, the main body housing 132 may be selectively openable to provide access to a housed component. A cleaning stage may be removably mounted to the main body and/or incorporated as part of the main body. For example, the apparatus 100 may have a first cleaning stage that is removably mounted to the main body and a second cleaning stage that is housed in the main body and may be non-removable therefrom, or it may be removable from the main body, optionally concurrently with the first cleaning stage.

In an in-use position for cleaning a surface, the upper end 116 is above the lower end 118. In some examples, the longitudinal axis 120 and the transverse axis 124 extend generally horizontally in the in-use position (e.g., for a hand vacuum, a robot vacuum, or a canister vacuum), as exemplified in FIGS. 1 and 7. In some examples, the surface cleaning apparatus is tilted forward during use into a reclined position in which the transverse axis 124 extends generally horizontally and the longitudinal axis 120 extends at an angle to the horizontal (e.g., for a stick vacuum or an upright vacuum), as exemplified in FIGS. 6 and 12.

It will be appreciated that the carry handle 134 may be any suitable handle. The carry handle may be configured to enable a user to move the surface cleaning apparatus when using the surface cleaning apparatus to clean a surface. In some embodiments, as exemplified in FIGS. 1 and 2, the carry handle 134 may be an under-hand carry handle. As exemplified, the carry handle 134 may be mounted to the apparatus upper end 116. The carry handle 134 may overly the main body housing 132 when the apparatus upper end 116 is above the apparatus lower end 118 (i.e., an in-use position of the surface cleaning apparatus). The carry handle 134 may extend along part or all of the suction motor, the pre-motor filter and/or an air treatment assembly. Arranging the carry handle 134 above a heavy and/or bulky component of the surface cleaning apparatus 100 may result in a more desirable hand-feel of the surface cleaning apparatus 100.

The carry handle 134 may extend away from the main body housing 132, as exemplified, so as to provide an enclosed hand grip area between the handle 134 and an upper surface of the apparatus. It will be appreciated that a handle may alternatively be a recessed handle formed by providing a recess in a surface of the apparatus. The carry handle may have a hand grip portion 136 that extends generally horizontally when the apparatus upper end 116 is above the apparatus lower end 118. The hand grip portion 136 has a longest dimension in the direction of a grip portion axis 138. As exemplified, the grip portion axis 138 of the carry handle 134 may be generally transverse to the apparatus transverse axis 124 and/or the apparatus vertical axis 122. As exemplified, the grip portion axis 138 of the carry handle 134 may be generally parallel to the apparatus longitudinal axis 120.

The carry handle (e.g., a carry handle base end 140 for a projecting handle) may be mounted to or formed in one or more of an openable and/or removeable apparatus wall, a suction motor housing, a pre-motor filter housing, a post-motor filter housing, and the air treatment assembly. As exemplified, the carry handle base end 140 may be mounted to an upper surface of the main body 132 by upwardly extending struts that extend between the upper surface (at the location of the carry handle base end 140) and the hand grip portion 136.

It will be appreciated that the main body housing 132 and/or carry handle 134 may be in other configurations, shapes, and/or positions in other embodiments. As exemplified in FIGS. 6 and 7, the carry handle 134 may be a pistol grip handle with a hand grip portion 136 extending generally vertically when the surface cleaning apparatus 100 is in the in-use position of FIG. 7. The grip portion axis 138 of a pistol grip carry handle 134 may be generally parallel to the vertical axis 122. In the exemplary embodiment of FIG. 7, the pistol grip handle extends downwardly and rearwardly. In some examples, the pistol grip handle extends downward from a lower surface of the main body housing 132. One or both ends of the hand grip portion 138 or struts extending therefrom may be secured to the main body housing 132. In the exemplary embodiment of FIG. 7, one end of the hand grip portion 138 is secured to the main body housing 132 and the other end is a free end.

Figure 3:
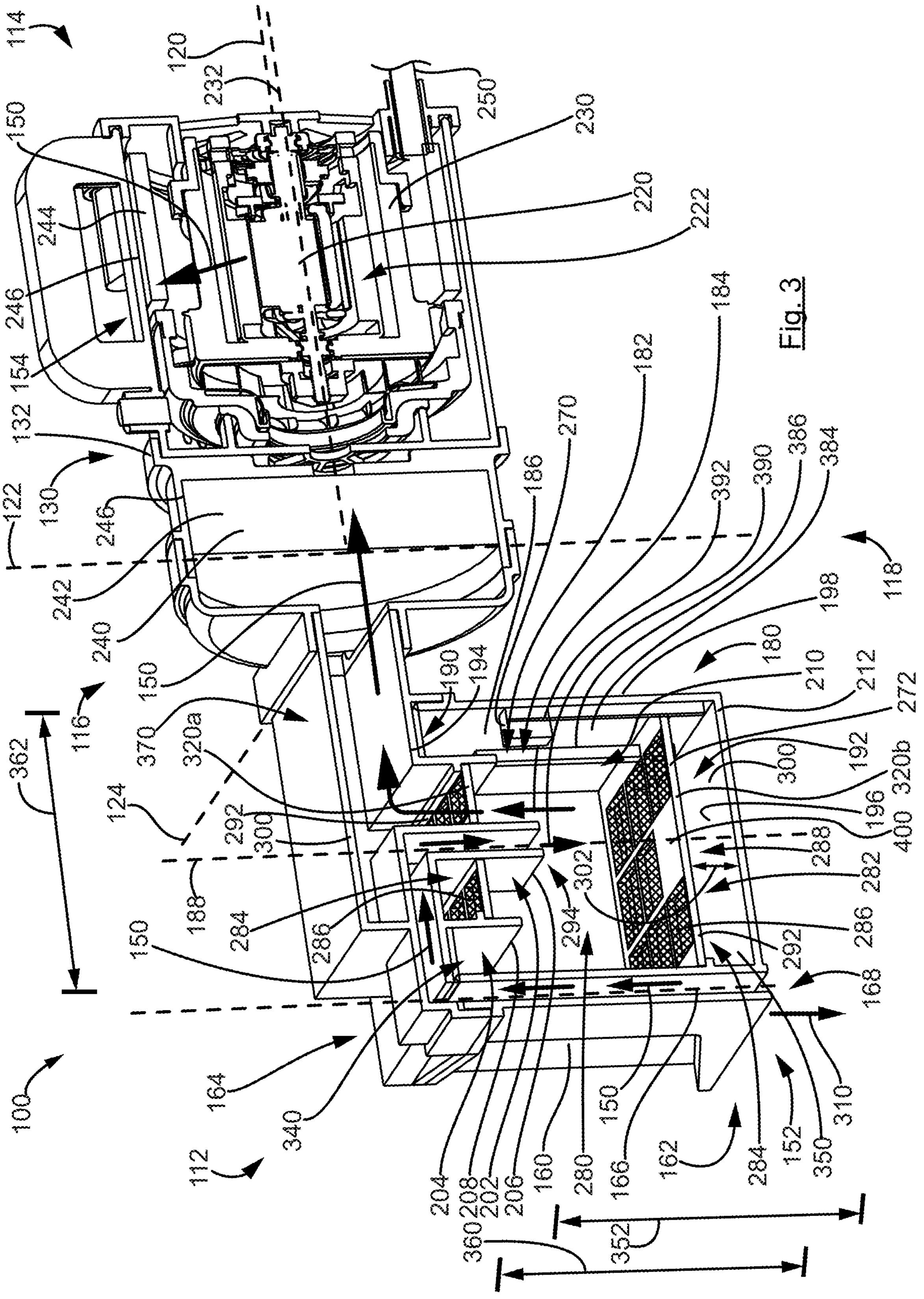
FIG. 3 is a vertical and longitudinal cross section perspective view of the surface cleaning apparatus of FIG. 1, with the inner chamber wall in a first position.

As exemplified in FIG. 3, an apparatus air flow path 150 extends from an apparatus dirty air inlet 152 to an apparatus clean air outlet 154.

The apparatus dirty air inlet 152 may be provided at the apparatus front end 112. Arranging the dirty air inlet at the front end 112 may help with using the dirty air inlet as a surface cleaning nozzle. The apparatus dirty air inlet 152 may have an inlet end that faces forwardly as exemplified (i.e., opening forwardly). As exemplified, the apparatus dirty air inlet 152 may be provided at the apparatus lower end 118. It will be appreciated that the dirty air inlet 152 may be located elsewhere, such as at the apparatus upper end 116 of the surface cleaning apparatus 100 (as exemplified in FIGS. 7 and 8) and/or at the apparatus rear end 114.

The apparatus dirty air inlet 152 may be provided at an inlet end of an apparatus inlet conduit 160. The apparatus inlet conduit 160 may extend from an apparatus inlet conduit inlet end 162 (forwardly as exemplified in FIG. 8) to an apparatus inlet conduit outlet end 164 (rearwardly as exemplified in FIG. 8) such as in a hand vac style product. The apparatus inlet conduit outlet end 164 opens into an internal chamber of the surface cleaning apparatus 100. As exemplified, in some embodiments the apparatus inlet conduit 160 is entirely external to the internal chamber, and an outlet port of the conduit 160 may be formed in a wall of the chamber into which the conduit 160 opens (e.g., a sidewall or an upper wall). It will be appreciated that in some embodiments the apparatus inlet conduit outlet end 164 may extend into an internal chamber of the surface cleaning apparatus 100 (i.e., a conduit projecting into the chamber).

As exemplified in FIG. 3 the apparatus inlet conduit 160 has an inlet conduit longitudinal axis 166 along a longest dimension of the inlet conduit 160 and extending between the apparatus inlet conduit inlet end 162 and the apparatus inlet conduit outlet end 164. Optionally, the inlet conduit 160 is a generally rearwardly extending conduit, as exemplified in FIG. 8. As exemplified in FIG. 3, the inlet conduit axis may extend between the apparatus lower end 118 and the apparatus upper end 112, and, as exemplified, may be generally vertical when the upper end 116 is above the lower end 118. As exemplified in FIG. 8, the inlet conduit longitudinal axis 166 may extend between the apparatus front end 112 and the apparatus rear end 114, and, as exemplified, may be generally horizontal when the apparatus upper end 116 is above the apparatus lower end 118. The inlet conduit longitudinal axis 166 may be generally parallel to the apparatus longitudinal axis 120 and/or the carry handle axis 138. The inlet conduit longitudinal axis 166 may be generally perpendicular to the apparatus longitudinal axis 120 and/or the carry handle axis 138.

As exemplified in FIGS. 1 and 2, the apparatus inlet conduit 160 may form a nozzle 168 of the surface cleaning apparatus 100. Alternatively, or additionally, the inlet conduit 160 may be connected or directly connected to an accessory. The accessory may be any suitable accessory tool such as a wand (e.g., wand 106, as exemplified in FIG. 6), a flexible conduit (e.g., a wet/dry vacuum hose with or without a rigid conduit at an upstream end thereof), a crevice tool, a mini brush, and the like. The accessory may be coupled to the surface cleaning apparatus 100 such that the accessory is in air flow communication with the apparatus dirty air inlet 152 (e.g., in air flow communication with the apparatus inlet conduit 160). For example, the accessory may be or include a conduit (e.g., wand 106), and the conduit of the accessory may be received within the apparatus inlet conduit 160 or may receive the apparatus inlet conduit 160 within the accessory conduit. Optionally, one or more releasable fasteners may be used to couple the accessory to the surface cleaning apparatus 100, such as clips or magnets. Alternatively, or additionally, the accessory may be held in air flow communication with the dirty air inlet via a friction fit (e.g., between an outer diameter of an accessory conduit and an inner diameter of the apparatus inlet conduit 160, or vice versa). Alternately, it will be understood that the apparatus inlet conduit 160 may be slideably receivable in an accessory conduit.

It will also be appreciated that, in some embodiments, the surface cleaning apparatus 100 may not include an apparatus inlet conduit 160, and the apparatus dirty air inlet 152 may instead open directly into a downstream chamber (e.g., an air treatment chamber) rather than being at an upstream end of a conduit. However, an apparatus inlet conduit 160 allows, e.g., a nozzle 168 to be formed for application to a surface that is to be cleaned, provides directionality to an air flow entering the surface cleaning apparatus 100, and/or provides a convenient attachment interface for an accessory. Accordingly, any inlet conduit may be used.

As exemplified in FIGS. 1 and 2, the apparatus clean air outlet 154 may be provided at the apparatus rear end 114. The apparatus clean air outlet 154 may be provided at the opposite end of the surface cleaning apparatus 100 from the apparatus dirty air inlet 152. The apparatus clean air outlet 154 may include a grill 170 located in a sidewall 172 of the surface cleaning apparatus 100 (e.g., a sidewall of the main body housing 132).

It will also be appreciated that the apparatus dirty air inlet 152 and/or the apparatus clean air outlet 154 may each be provided at different locations (e.g., they need not be on the same side of apparatus 100) and/or be of different configurations.

As exemplified in FIGS. 1 to 4, the surface cleaning apparatus 100 includes an air treatment assembly 180. The apparatus air flow path 150 extends through the air treatment assembly 180. The air treatment assembly 180 is configured to remove particles of dirt and other debris and/or water from the airflow and/or otherwise treat the airflow.

The air treatment assembly 180 or a portion thereof may be removably mounted to the main body housing 132. The air treatment assembly 180 may be openable when mounted to the main body housing and/or when removed therefrom. It will be appreciated that the air treatment assembly 180 or the portion thereof may be removeable from the main body housing 132 in any suitable way, such as translationally or rotationally. It will be appreciated that the air treatment assembly 180 or the portion thereof may be removeable from the main body housing 132 in any direction, such as upwardly, downwardly, forwardly, rearwardly, or laterally. It will be appreciated that the air treatment assembly 180 or the portion thereof may be secured to the main body 130 in any suitable way, such as by releasable fasteners such as screws, clasps, or magnets, which may be releasable or overcome by a predetermined force to be applied by a user. In some embodiments, the air treatment assembly 180 or a part thereof is released by a user action, such as by a user interaction with a button or other toggle of a user interface 178.

The air treatment assembly includes one or more air treatment members 182 in one or more stages. Any air treatment member or members known in the art may be used. For example, an air treatment stage of the surface cleaning apparatus may use one or more cyclones, mechanical or non-cyclonic momentum separators, bags, screens, physical filter media (e.g., foam, felt, HEPA) or the like. The air treatment member 182 may be provided upstream or downstream from the suction motor.

The air treatment member 182 includes an air treatment chamber 184. The air treatment chamber 184 includes walls 186. It will be appreciated that any suitable form of chamber 184 may be used, such as a generally rectangular chamber or a generally cylindrical chamber. In some examples, the air treatment chamber 184 includes a longitudinal axis 188 extending between a first end 190 and a second end 192 opposite the first end 190. The air treatment chamber may be an upwardly-downwardly extending chamber (i.e., the long dimension of the chamber). In some examples, as exemplified n FIG. 3, the first end 190 is an upper end at the apparatus upper end 116 and the second end 192 is a lower end at the apparatus lower end 118. The chamber 184 may include a first end wall 194 at the first end 190, and a second end wall 196 at the second end 192. In some examples, as exemplified in FIG. 3, the first end wall 194 is an upper wall and the second end wall 196 is a lower wall. In some examples the air treatment chamber may be a forwardly-rearwardly extending chamber (i.e., the long dimension of the chamber). In some examples, as exemplified in FIG. 8, the first end 190 is a front end at the apparatus front end 112 and the second end 192 is a rear end at the apparatus rear end 114. In some examples, as exemplified in FIG. 8, the first end wall 194 is a front wall at the apparatus front end 112 and the second end wall is a rear at the apparatus rear end 114. The second end wall 196 may face the first end wall 194 across the chamber 184. In some examples, the first and second end walls 194, 196 are generally planar walls. In some examples, a sidewall 198 extends between the first and second ends 190, 192, and may extend between the first and second end walls 194, 196. The sidewall 198 may be a generally cylindrical wall and the longitudinal axis 188 may be an axis of rotation of, e.g., a cyclone chamber. However, it will be appreciated that the air treatment member 182 may not be a cyclone. In some examples, the air treatment member 182 is a mechanical or non-cyclonic momentum separator, as exemplified in FIGS. 3 and 4.

The air treatment chamber 184 includes a chamber air inlet 202 and a chamber air outlet 204. The chamber air inlet 202 includes an inlet port 206. Similarly, the chamber air outlet 204 includes an outlet port 208. It will be appreciated that the chamber air inlet 202 and the chamber air outlet 204 may each be any suitable inlet or outlet, may be at any particular location on the air treatment chamber 184, and may include a conduit 260 projecting into the air treatment chamber 184 with the inlet port 206 or outlet port 204 at an inward end 262 of the conduit 260. As exemplified, the air inlet 202 may include an outlet end 164 of the inlet conduit 160.

In some examples, the chamber air inlet 202 and/or the chamber air outlet 204 are arranged at the first and/or second ends 190, 192 of the chamber 184. As exemplified, the chamber air inlet 202 may be provided above a lower end of the chamber 182, and optionally at an upper end of the chamber 184. The chamber air outlet 204 may also be provided above a lower end of the chamber 182, and optionally at the upper end of the chamber 184. The air outlet 204 and air inlet 202 may be provide at a common end, e.g., the upper end (e.g., as exemplified in FIG. 3). Although it will be appreciated that the air inlet and/or air outlet may each be provided at different locations (e.g., they need not be on the same end of chamber 184) and/or be of different configurations.

The air treatment member 182 may be openable to, e.g., allow for material removal. An openable air treatment member 182 includes an openable portion such as a door. One or both of the member end walls (e.g., upper and/or lower walls), or a portion of one or each of the member end walls, may be openable. Opening an end of the chamber may facilitate access to the member air inlet and/or air outlet. Alternatively, or additionally, the member sidewall or a portion thereof may be openable. As exemplified by the air treatment member 182 in FIGS. 3 to 5, the member end wall (e.g., the second end wall 196) may be removeable from the member sidewall 198 to open the chamber. The member end wall may seat on the member sidewall 198. It will be appreciated that the member end wall may be secured to the member sidewall in any suitable way, such as via a friction fit or a releasable fastener (e.g., a clasp or threaded fastener) and it may be removable and/or rotationally (e.g., pivotally) openable.

The air treatment assembly 180 includes a separated material collection region 210. It will be understood that the air treatment member 182 and separated material collection region 210 may be of any configuration suitable for separating material (i.e., dirt and liquid) from an air stream and collecting the separated material, respectively. In accordance with this disclosure, a surface cleaning apparatus may use one or more of the different aspects of an air treatment member 182 and a separated material collection region 210 discussed herein.

As exemplified FIGS. 3 and 4, and as discussed in more detail subsequently, a separated material collection region 210 may be an internal region of an air treatment chamber 184. The separated material collection region 210 may be at the bottom end of the air treatment chamber 184. As exemplified by the air treatment member 210 of FIG. 13, a separated material collection region 210 may be in a separated material collection chamber 212 that is external to an air treatment chamber. Where the separated material collection chamber 212 and the air treatment chamber 184 are discrete chambers, the separated material collection chamber 212 communicates with the air treatment chamber 184 via a separated material outlet 214 (e.g., an opening in a wall of the air treatment chamber or a gap between walls of the air treatment chamber). The separated material outlet 214 may be at an upper end of the separated material collection chamber 212. As exemplified, the separated material collection chamber 212 and air treatment chamber 184 are discrete chambers.

It will be appreciated that the air treatment assembly 180 may include any suitable number of separated material collection regions 210, such as a separated material collection region 210 for each air treatment chamber 184 if a plurality of air treatment chambers 184 are included. Although it will be appreciated that, in some examples, multiple air treatment chambers may share a separated material collection region (e.g., two cyclones each with a separated material outlet opening into a common separated material collection chamber), and/or an air treatment member may include two or more discrete separated material collection regions. In some embodiments, the air treatment assembly 180 and/or an air treatment chamber thereof may include separate collection regions for different types of separated material (e.g., fine dirt, coarse dirt, and/or liquid), and/or separate separated material outlets to a common separated material collection chamber for different types of separated material.

As exemplified FIGS. 3 to 5 and as discussed in more detail subsequently, the separated material collection region 210 may be an openable region for removal of separated material. In some examples, the air treatment chamber 184 and the separated material collection region 210 or a chamber thereof may be accessed through a common selectively openable doorway (e.g., because the separated material collection region 210 is an internal region of the air treatment chamber 184 or because the doorway opens into both the air treatment chamber 184 and a discrete e.g., laterally positioned, separated material collection chamber 212). In some examples, the air treatment chamber 184 and the separated material collection region 210 or a chamber thereof are separately openable, such that one may be opened while the other remains closed. In some examples, the separated material collection region 210 includes two or more discrete chambers, and one or more of those chambers is separately openable from one or more other of those chambers, as described further elsewhere herein.

As exemplified in FIG. 3, the surface cleaning apparatus 100 also includes an air moving member 220. The air moving member 220 is positioned in the apparatus air flow path 150. The air moving member 220 is provided to generate air flow (e.g., vacuum suction) through the air flow path 150. The air moving member 220 may include a suction motor and fan assembly 222. The suction motor and fan assembly 222 includes a motor and at least one fan. At least one of the fan(s) is positioned in the apparatus air flow path 150. The suction motor and fan assembly 222 may be a bypass assembly, in which the motor is sealed apart from the air flow path, e.g., to reduce the risk of exposure to liquid carried in the air flow path.

The air moving member 220 may be contained within a moving member housing 230. The moving member housing 230 may form part of the outer surface of the main body housing 132, or may be internal thereto. The moving member housing 230 may be of any suitable construction, including any of those exemplified herein.

The air moving member 220 in the illustrated example is positioned downstream from the air treatment assembly 180, although it will be appreciated that the air moving member 220 may be positioned upstream of the air treatment assembly 180 or an air treatment member thereof (e.g., a dirty air motor) in alternative embodiments.

As exemplified, in some embodiments the air moving member 220 rotates about a moving member axis of rotation 232 (e.g., a suction motor axis of rotation). In some examples, when the apparatus upper end 116 is positioned above the apparatus lower end 118, the moving member axis of rotation 232 is oriented generally horizontally and extends between the apparatus front end 112 and the apparatus rear end 114. In other examples, however, the moving member axis of rotation 232 may extend at any angle to the horizontal, or it may extend vertically (e.g., as in FIG. 13). Accordingly, the air moving member 220 may be oriented in any direction within the surface cleaning apparatus 100. The moving member axis of rotation 232 may be generally parallel to the member longitudinal axis 188, and may be spaced (e.g., vertically spaced) from the member longitudinal axis 188 of one or more air treatment member and/or coaxial with one or more member longitudinal axis 188. As exemplified, the moving member axis of rotation 232 may intersect the separated material collection region 210.

The surface cleaning apparatus 100 may include one or more filters 240 in an air flow path of the surface cleaning apparatus 100. A filter 240 may be one or more of a foam filter, felt filter, HEPA filter, other physical filter media, electrostatic filter, and the like. Optionally, a filter 240 includes a series of screens, and, optionally, each downstream screen of the filter has finer pores than the preceding upstream screen. The filter 240 may be formed from any suitable physical, porous filter media and may have any suitable shape, including the examples disclosed herein.

The surface cleaning apparatus 100 may include a pre-moving member filter 242 upstream of the moving member 220 and/or a post-moving member filter 244 downstream of the moving member. A pre-moving member filter 242 removes dirt (e.g., fine dust) that could otherwise damage the moving member 220, such as by accumulating on fan blades or interfering with motor movement. A post-moving member filter 244 removes dirt (e.g., carbon dust from the motor) that would other wise be released by the surface cleaning apparatus 100. For example, the pre-moving member filter 242 may be a pre-motor filter provided in the air flow path 150 upstream of the motor and fan assembly. If a bypass motor is provided as discussed elsewhere herein, then the pre-moving member filter 242 may be upstream of a fan blade provided in the air flow path. The post-moving member filter 244 may be a post-motor filter provided in the air flow path 150 downstream of the motor and fan assembly. If a bypass or cooling motor is provided as discussed elsewhere herein, then the post-moving member filter 244 may be downstream of a fan blade or motor provided in the air flow path 150 or a cooling air flow path passing through a motor of a bypass motor and fan assembly. It will be appreciated that the surface cleaning apparatus 100 may have any suitable number of filters 240.

A filter 240 may be provided in a filter housing 246. The filter housing 246 may be of any suitable construction, including any of those exemplified herein. The filter housing 246 may be openable or accessible to allow the filter 240 to be cleaned and/or replaced. As exemplified, the moving member axis of rotation 232 may intersect one or more filter housing 246. In some embodiments, the moving member axis of rotation 232 intersects at least one filter housing 246 of a pre-moving member filter 242 received in the main air flow path 150. A filter housing 246 may form part of the outer surface of the main body housing 132. Optionally, a filter housing 246 forms part of the main body housing sidewall 172. A post-moving member filter 244 may be located radially outwards of the moving member 220, as exemplified by the post-moving member filter 244 illustrated in FIG. 3. A pre-moving member filter 242 and/or a post-moving member filter 244 may come in any suitable shape and be at any suitable location.

As exemplified in FIG. 3, power may be supplied to the surface cleaning apparatus 100 (e.g., to components or elements such as the air moving member 220) from an external source. As exemplified, surface cleaning apparatus 100 may include a power cord 250 that is connectable to household mains. Optionally, as exemplified, the power cord 250 may enter the main body housing 132 at a rear end of the housing. However, it will be appreciated that the power cord may be provided in any configuration and/or location in the surface cleaning apparatus 100. It will be appreciated that the power source may alternatively, or additionally, include one or more on-board energy storage member(s) (e.g., a battery, a capacitor, optionally a plurality which may be provided in a pack such as a removable pack).

Figure 4:
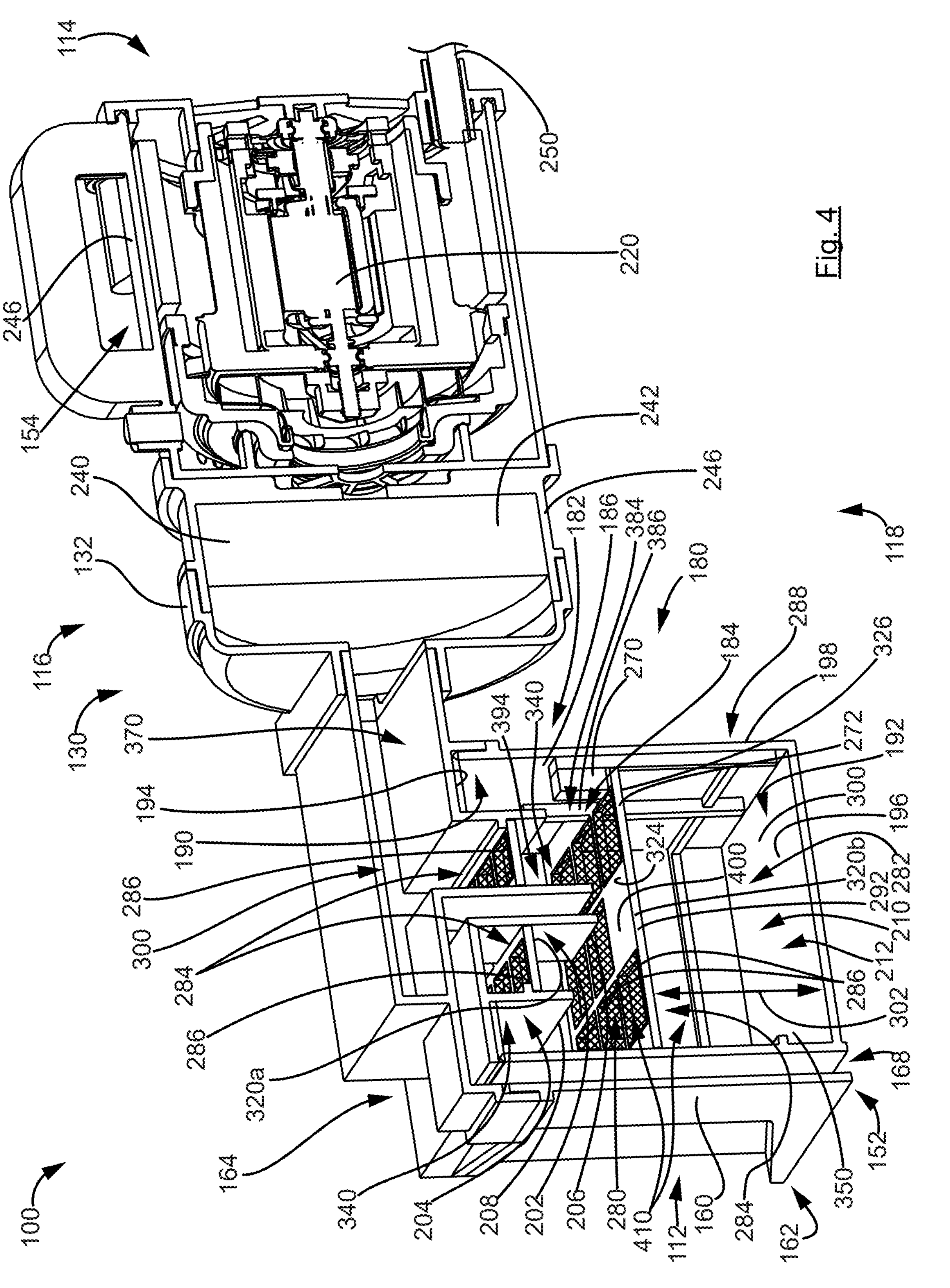
FIG. 4 is a vertical and longitudinal cross section perspective view of the surface cleaning apparatus of FIG. 1, with the inner chamber wall in a second position.

As exemplified in FIGS. 3 and 4, it will also be appreciated that the surface cleaning apparatus 100 may include a user interface 178. The user interface 178 may be part of a main control system 252 of the surface cleaning apparatus 100. The main control system 252 controls operation of the air moving member. As exemplified, the user interface 178 may be single power on/off button. Alternately, it may be a touch screen interface and/or include a display screen. The main control system 252 may include a circuit joining the power on/off button to the air moving member 220 to control operation of the air moving member 220. However, it will be appreciated that any suitable control system 252 may be used. For example, a control system may include a more complex user interface with multiple buttons, switches, and/or screens (e.g., one or more soft buttons provided on a touchscreen). As another example, the control system may include one or more onboard processors communicatively coupled to one or more on board data storage systems storing instructions, such as to respond to a user selection from between two or more operational modes (e.g., a carpet mode and a hard floor mode, which may determine a motor rotation speed and/or brush roll positioning) or to respond to sensor input from an onboard sensor (e.g., responding by changing the speed of rotation of the air moving member 220).

As exemplified, the user interface 178 may be provided at the apparatus upper end 116. Optionally, the user interface 178 is provided on a top surface of the main body housing 132. The user interface may face upwardly as exemplified (i.e., visible when looking down at the surface cleaning apparatus 100 along the apparatus vertical axis 122 when the apparatus is in use). A user interface at the apparatus upper end 116 is more readily accessible to a user than a user interface at the apparatus lower end 118. As exemplified, the user interface may be provided adjacent the carry handle 134, such as on the carry handle 134 as exemplified in FIG. 7. Optionally, the user interface may be provided on the handle. A user interface adjacent the carry handle may be readily accessible to a user that is already interacting with the carry handle. However, it will be appreciated that the user interface 178 may be provide at any position on the surface cleaning apparatus 100.

The surface cleaning apparatus 100 may include one or more actuators 270, as exemplified in FIGS. 3 and 4. Any moveable component of the surface cleaning apparatus 100 may be an operated device operated by an actuator. As exemplified in FIGS. 3 and 4, an actuator 270 is drivingly connected to an operated device 272 (e.g., a door, flap, biasing member, wiper, etc.) of the surface cleaning apparatus 100 to operate the operated device 272. The actuator 270 may be, e.g., mechanically drivingly connected (i.e., via a mechanical linkage), pneumatically drivingly connected (e.g., via an air flow path, such as an air flow path within a piston chamber pressurised by movement of a piston), magnetically drivingly connected or electromechanically connected, e.g., a solenoid.

An actuator may be an automatic actuator responsive to a sensed condition (e.g., a pressure of the air flow path 150 or a predetermined programmed condition such as a period of time elapsed since the air moving member was powered on), or the actuator may be a user-controlled actuator responsive to a user action (e.g., a button press, lever movement, accessory attachment or removal, or vacuum mode selection such a selection between a carpet mode and a hard floor mode). The actuator 270 may be a powered actuator receiving power from a power source of the surface cleaning apparatus 100. The actuator may be a condition-responsive actuator responsive directly to a change in a condition, such as a float actuator raised by an increased water level in a float chamber or a flexible diaphragm adjacent the air flow path 150 responding directly to pressure changes in the air flow path. The actuator 270 may be a manual actuator, such as moved by a lever or button that is operated by being slid or pushed by a user.

The actuator 270 may be communicatively coupled to the main control system 252 to send and/or receive information. The actuator may receive instructions and/or power from the main control system 252. Alternatively, the actuator may be controlled by a discrete control system separate from the main control system 252, such as a simple circuit. A simple circuit may not include a processor or a data storage device, such as a circuit with a toggle (e.g., a switch, slider, or button) that closes the circuit when activated and breaks the circuit when deactivated. For example, an actuator may itself close a circuit to actuate a solenoid (e.g., a conductive float raised by a water level).

The following is a discussion of a number of aspects, namely a divided separated material collection region, a collection region opening shaped to inhibit liquid exit, an adjustable division of the separated material collection region, a collection region in the air flow path, a collection region out of the air flow path, impermeable portions of the inner chamber wall, separately openable collection chambers, an impact surface, a shielded junction, and a plurality of inlet nozzles, which are disclosed herein. Each aspect may be used by itself or in combination with one or more of the other aspects disclosed herein.

Divided Separated Material Collection Region

The following is a description of a separated material collection region 210 which is divided into a solid collection chamber and a liquid collection chamber. The solid collection chamber is discrete from the liquid collection chamber. The separated material collection region 210 is divided by an inner chamber wall. At least a portion of the inner chamber wall is porous and connects the solid collection chamber in fluid communication with the liquid collection chamber. An air treatment member 182 may comprise or consist of one or more separated material collection regions 210.

Separating solids collected in the surface cleaning apparatus from liquids collected in the surface cleaning apparatus allows a user to dispose of the solids differently from the liquids. For example, a user may dispose of the solids in a garbage can and the liquids in a toilet.

A porous portion of a chamber wall between a solids collection chamber and a liquids collection chamber allows liquid to move from the solid collection chamber into a separated liquid collection chamber. Accordingly, the liquid collection chamber may be at a lower elevation than the solid collection chamber when the surface cleaning apparatus 100 is in the in-use position an/or the storage position, to encourage liquid to flow out of the solid collection chamber and into the liquid collection chamber. In some examples, the liquids are free to move between the solid collection chamber and the liquid collection chamber while the solids are obstructed from moving from the solid collection chamber to the liquid collection chamber by the porous portion, although it will be appreciated that the solids and liquids collection chambers may be selectively isolated from one another (e.g., via a selectively openable door closing a port or passageway between them).

As exemplified in FIGS. 3 and 4, the separated material collection region 210 is divided into a solids collection chamber 280 and a liquids collection chamber 282. The liquids collection chamber 282 and the solids collection chamber 280 are divided from one another by a porous barrier 284. The solids collection chamber 280 and the liquids collection chamber 282 are in fluid communication via a porous portion 286 of the porous barrier. The porous portion 286 is liquid permeable. The porous portion 286 may include, e.g., a wire mesh screen, a laser formed screen, a porous rigid plastic member, or a porous foam barrier. In the exemplary embodiment of FIGS. 3 and 4, the porous portion 286 includes a wire mesh screen.

At least a first portion 288 of the liquids collection chamber 282 is below (i.e., at a lower elevation than) the solids collection chamber 280 relative to gravity when the surface cleaning apparatus 100 is in the in-use position and/or storage position. As exemplified in FIG. 3, the liquids collection chamber 282 may underly or directly underly the solids collection chamber 280 when the surface cleaning apparatus 100 is in the in-use position. In the exemplary embodiment, the solids collection chamber 280 overlies and is directly in communication with the liquids collection chamber 282 by the porous portion 286. As exemplified, the solids collection chamber may be directly above the liquids collection chamber. However, it will be appreciated that the solids collection chamber 280 and the liquids collection chamber 282 may be spatially separated within the surface cleaning apparatus 100. The surface cleaning apparatus 100 may include a transfer passageway (e.g., a sloped passageway extending between chambers or other components of the surface cleaning apparatus) between the solids collection chamber 280 and the liquids collection chamber 282. Accordingly, they may be partially or fully laterally spaced apart.

Figure 8:
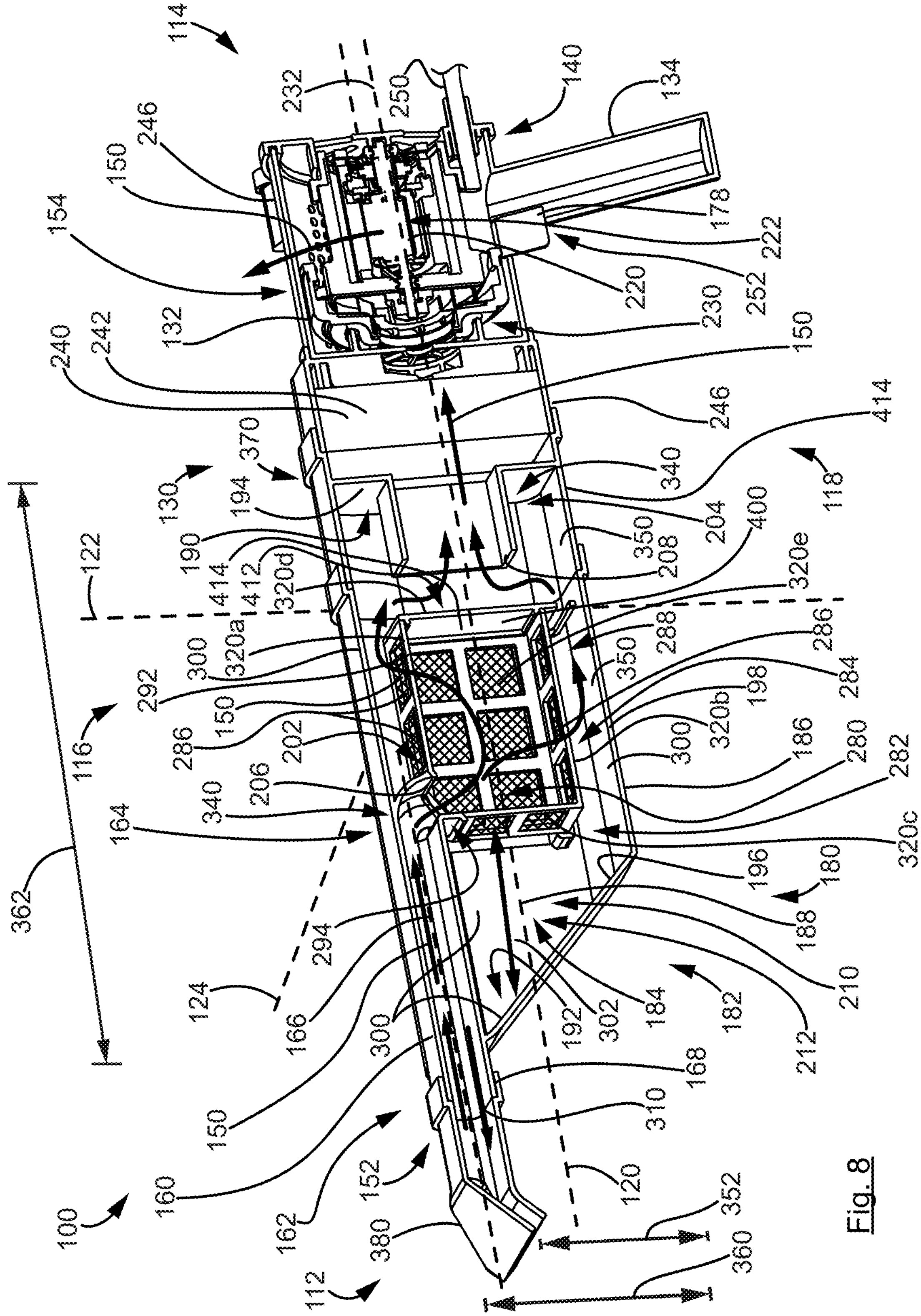
FIG. 8 is a vertical and longitudinal cross section perspective view of the surface cleaning apparatus of FIG. 6.

In some embodiments, the solids collection chamber 280 is an inner collection chamber positioned within an outer liquids collection chamber 282 (see for example FIG. 8). As exemplified, the separated material collection region 210 includes the separated material collection chamber 212. In the exemplary embodiment, the porous barrier 284 is an inner chamber wall 292 dividing the separated material collection chamber 212 into at least two discrete sub-chambers including the inner solids collection chamber 280 and the outer liquids collection chamber 282. The inner chamber wall 292 divides off a portion of the separated material collection chamber 212 to form the solids collection chamber 280 in which solids are to be contained. The liquids collection chamber 282 is behind the inner chamber wall 292 relative to a separated material dirt collection chamber inlet 294 through which material is introduced to the separated material collection chamber 212. The collection chamber inlet 294 opens into the solids collection chamber 280. As described further elsewhere herein, the collection chamber inlet 294 may be part of an air treatment chamber air inlet 202 where the separated material treatment region is within an air treatment chamber, or the collection chamber inlet 294 may be in communication with a separated material outlet of a discrete air treatment chamber to receive separated material from the air treatment chamber.

The porous portion 286 faces a facing wall 300 of the walls of the separated material collection chamber 212. As exemplified, the porous portion 286 is separated from the facing wall 300 by a spacing distance 302. The porous portion 286 may extend generally parallel to the facing wall 300, although it will be appreciated that the porous portion may extend at an angle to the facing wall as exemplified in FIG. 8 (optionally meeting the facing wall at one or more edges of the porous portion or inner wall portion). Optionally, the porous portion 286 and/or the facing wall 300 are generally planar.

As exemplified in FIG. 4, a single inner chamber wall 292 with porous portions 286 is provided. In this embodiment, the solids collection chamber 280 overlies and is directly in communication with the liquids collection chamber 282.

It will be appreciated that more than one portion of the inner chamber wall 292 may comprise or consist of a porous portion 286. Accordingly, the solids collection chamber 280 may be partially or fully located within the liquids collection chamber 282. For example, as exemplified in FIG. 8, the inner chamber wall 292 includes more than one porous portion 286*m* and each porous portion 286 is formed in a different wall portion of the inner chamber wall 292. As exemplified in FIG. 8, the inner chamber wall 292 may include a plurality of wall portions 320, such as an upper wall portion 320*a* facing upwards along the vertical axis 122 (i.e., including a portion extending generally perpendicular to the vertical axis 122), a lower wall portion 320*b* facing downwards along the vertical axis 122, and/or one or more side wall portions facing outwards along the longitudinal and/or transverse axes 120, 124. Side wall portions may include a front wall portion 320*c* facing forwards along the longitudinal axis 120, a rear wall portion 320*d* facing rearwards along the longitudinal axis 120, a right lateral wall 320*e* facing right along the transverse axis 124, and/or a left lateral wall 320*f* facing left along the transverse axis 124. At least two of the wall portions 320 may comprise or consist of porous portions 286. In some examples, the lower wall portion 320*b* includes a porous portion 286. In some examples, the upper wall portion 320*a*, the lower wall portion 320*b*, and at least two of the side wall portions include a porous portion 286.

The dirty air inlet 152 is directed in a dirty air inlet direction 310. The inner chamber wall 292 may include a porous portion spaced from a facing wall 300 in the dirty air inlet direction 310. In use, the surface cleaning apparatus 100 may be oriented with the dirty air inlet 152 directed generally forwardly and/or downwardly. Alternately, the dirty air inlet may face a non-porous portion of a wall and/or a baffle.

A portion of the liquids collection chamber 282 may be positioned below the solids collection chamber when the apparatus is in use to clean a surface. For example, in the embodiment of FIG. 1, the solids collection chamber overlies the liquids collection chamber 282. In the embodiment of FIG. 8, the liquids collection chamber 282 has a portion forward of the solids collection chamber. Therefore, when used as a stick vac to clean a surface as exemplified in the orientation of FIG. 6, the solids collection chamber overlies a portion of the liquids collection chamber 282. As exemplified, the divided separated material collection chamber 212 may include a porous portion 286 in the front wall portion 320*c* of the inner chamber wall and separated from a front wall of the liquids collection chamber 282 to keep solids above a water level when liquid collects in a forward end of the liquids collection chamber 282 (e.g., when the dirty air inlet is provided at a front end 112 of the surface cleaning apparatus 100).

The divided separated material collection chamber 212 may include a porous portion 286 in the lower wall portion 320*b* of the inner chamber wall and separated from a lower wall of the liquids collection chamber 282 to keep solids above a water level when liquid collects in a lower end of the separated material collection chamber 212 (e.g., a lower end 118 of the surface cleaning apparatus 100 as exemplified in FIG. 1 and/or when the dirty air inlet is provided at a front end 112 of the surface cleaning apparatus 100 and the surface cleaning apparatus is positioned horizontally as exemplified in the orientation of FIG. 8).

Figure 9:
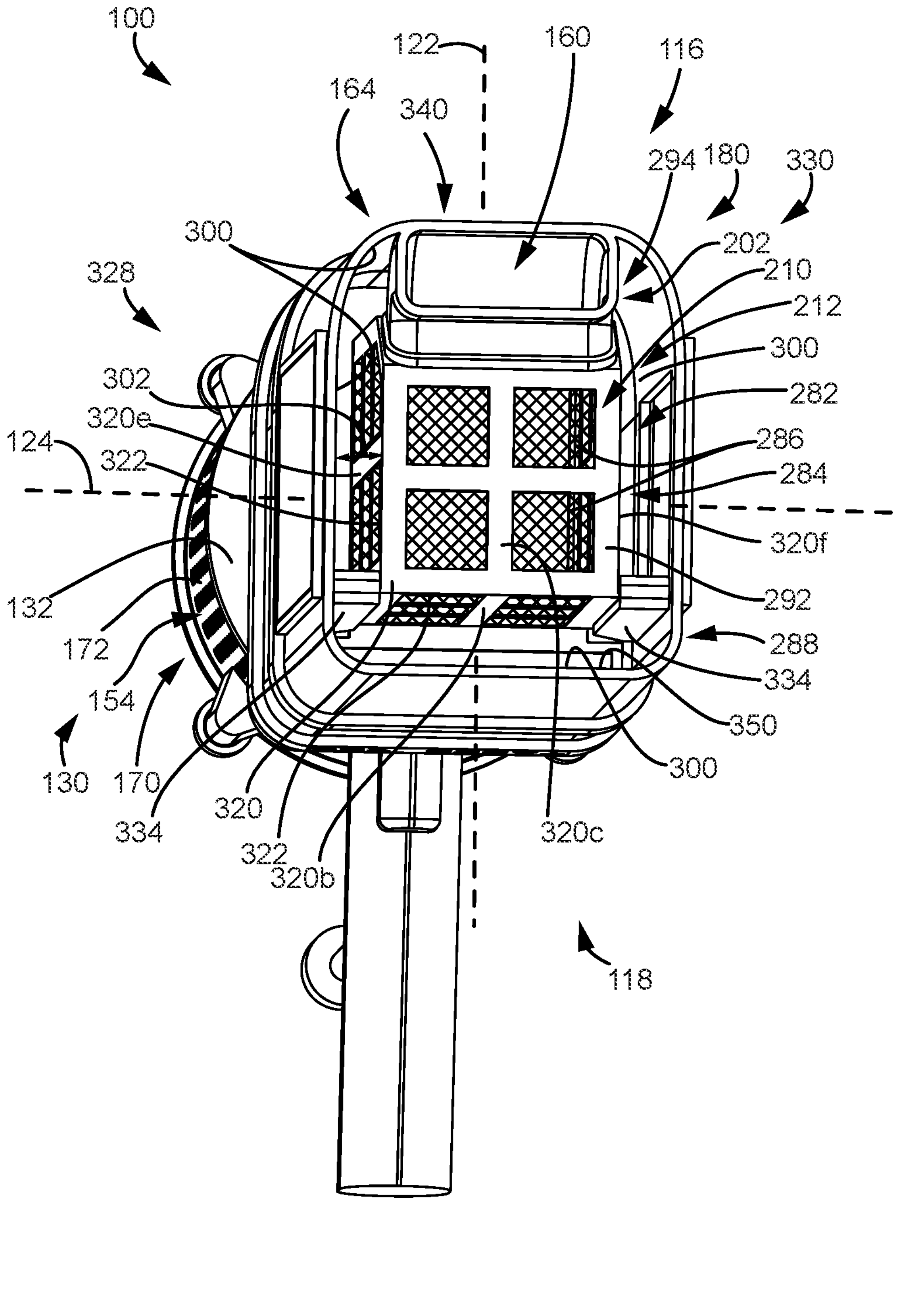
FIG. 9 is a vertical and transverse cross section perspective view of the surface cleaning apparatus of FIG. 6.
Figure 10:
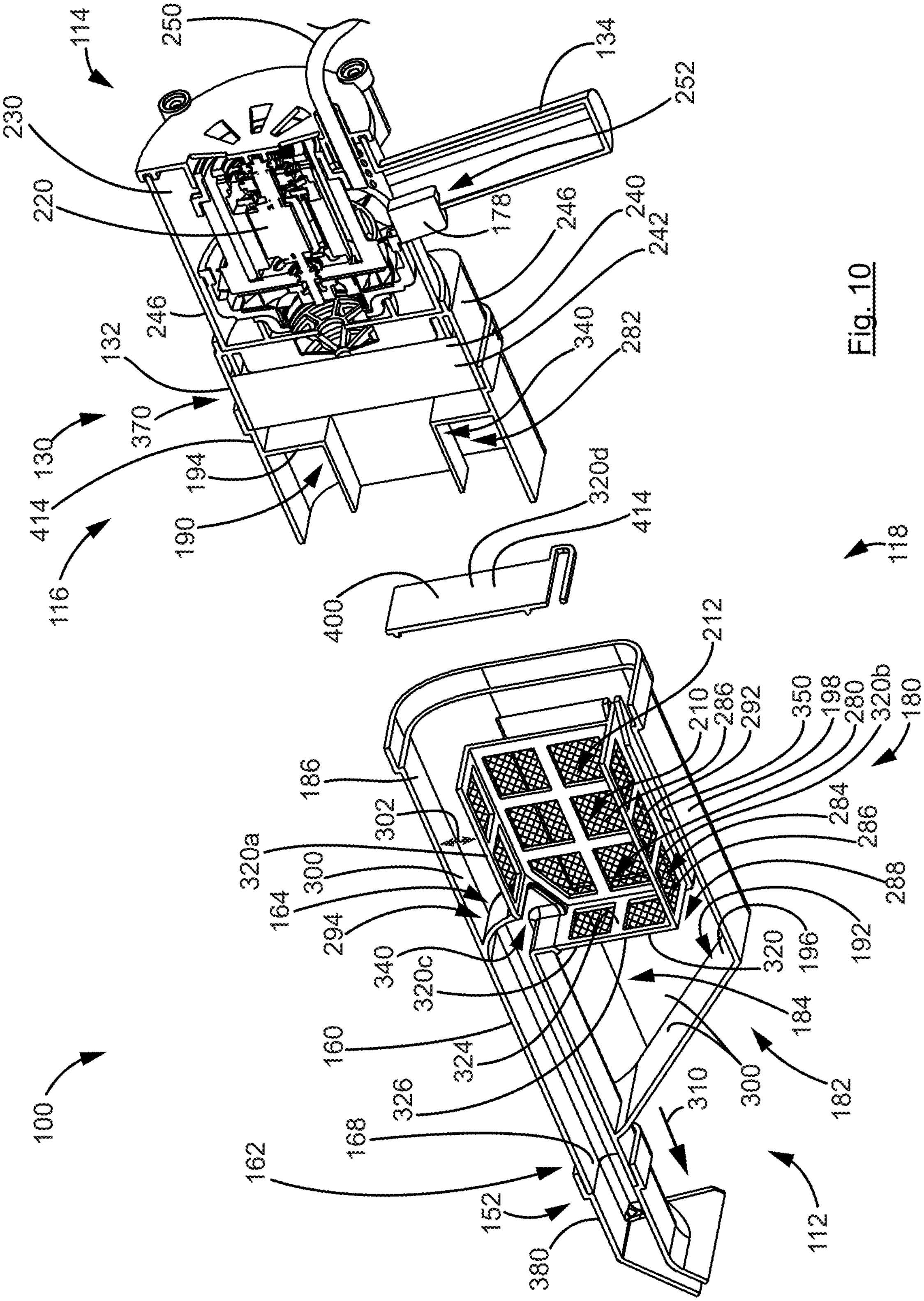
FIG. 10 is a vertical and longitudinal cross section perspective view of the surface cleaning apparatus of FIG. 6 in an open configuration.

Optionally, a wall portion 320 is a generally planar wall portion. Two or more wall portions 320 may meet at an edge 322 as exemplified in FIGS. 8 and 9. Accordingly, the inner surface 324 and/or outer surface 326 (FIG. 10) may have corners. However, it will be appreciated that a wall portion 320 may be non-planar, and wall portions may meet at a curved connection to present a generally continuous inner surface 324 and/or outer surface 326 of the inner chamber wall 292. Including multiple wall portions 320 with porous portions 286 allows liquids to move from the inner solids collection chamber 280 to the outer liquids collection chamber 282 when the surface cleaning apparatus 100 is in a position other than the in-use position, such as when the surface cleaning apparatus is pitched to a downwardly directed position in which the rear end 114 is above the front end 112 and/or rolled to a position in which a first lateral side 328 is above a second lateral side 330.

In some examples, the inner solids collection chamber 280 is suspended within the outer liquids collection chamber 282. The outer liquids collection chamber 282 extends above and below, in front and behind, and to each lateral side of the inner solids collection chamber 280. Accordingly, the liquids collection chamber 282 directly underlies the solids collection chamber 280 regardless of the orientation of the surface cleaning apparatus 100. As exemplified in FIGS. 8 and 9, one or more supports 334 (e.g., struts or other support members) supports the inner chamber wall 292 suspended within the separated material collection chamber 212.

Collection Region Opening Shaped and/or Positioned to Inhibit Liquid Exit

The following is a description of a collection region flow opening 340, wherein the collection region flow opening 340 is shaped and/or positioned to inhibit the flow of liquid out of the collection region via the collection region flow opening. The collection region flow opening 340 is an opening between an interior and an exterior of the collection chamber 212 that is open during operation of the surface cleaning apparatus. The opening 340 is open during operation to allow for the flow of separated material (e.g., liquids and/or solids) and/or air.

It will be appreciated that the separated material collection region 210 includes at least one collection region flow opening 340 through which material is introduced to the separated material collection region. This material is either material that has been separated from the air flow in a discrete air treatment chamber and then passed to the collection region, or this material is entrained in air flowing in an air flow path that extends through the collection region. The collection region 210 may include a plurality of collection region flow openings 340, such as the air inlet 202 and the air outlet 204 in examples in which the air flow path 150 extends through the separated material treatment chamber as described elsewhere herein.

As exemplified in FIGS. 3 and 4, to inhibit liquids in the separated material collection region 210 from exiting through the collection region flow opening 340, the collection region flow opening 340 is located above at least a portion of the collection chamber 212 when the surface cleaning apparatus 100 is in the in-use position. Accordingly, liquids may be collected in the portion of the chamber below the collection region flow opening 340. Optionally, as exemplified at FIGS. 3 and 4, the collection region flow opening 340 is at an upper end of the separated material collection region 210 when the surface cleaning apparatus is in an in-use position.

Liquid collects on the surface of the separated material collection chamber 212 that forms a floor or lower liquid collection surface 350. When the surface cleaning apparatus 100 is in the in-use position, the lower liquid collection surface 350 is a surface of the liquids collection chamber 282. The bottom end of the collection region flow opening 340 may be spaced by at least a minimum spacing distance 352 from the lower liquid collecting surface 350 when the surface cleaning apparatus 100 is in the in-use position.

As described elsewhere herein, the surface cleaning apparatus 100 is generally oriented with the upper end 116 above the lower end 118 when in use, and may be tilted forwards. Liquid may gather towards the bottom end 118 and/or the front end 112 of the surface cleaning apparatus 100. In some examples, the air treatment chamber 184 includes a maximum height 360 along the vertical axis 122 and a maximum length 362 along the longitudinal axis 120, and the collection region flow opening 340 is spaced at least a quarter, a third, or a half of the length 362 from the forwardmost part of the front end and/or the collection region flow opening 340 is spaced at least a quarter, a third, or a half of the height 360 from a bottommost part of the bottom end of the separated material collection chamber 212. As exemplified in FIGS. 3 and 4 the dirty air inlet 152 is provided at a front end 112 of the surface cleaning apparatus 100, the air moving member 220 is positioned rearward of the dirty air inlet 152 and the flow opening 340 is positioned rearward of a middle of the length 362.

Figures 6, 6A:
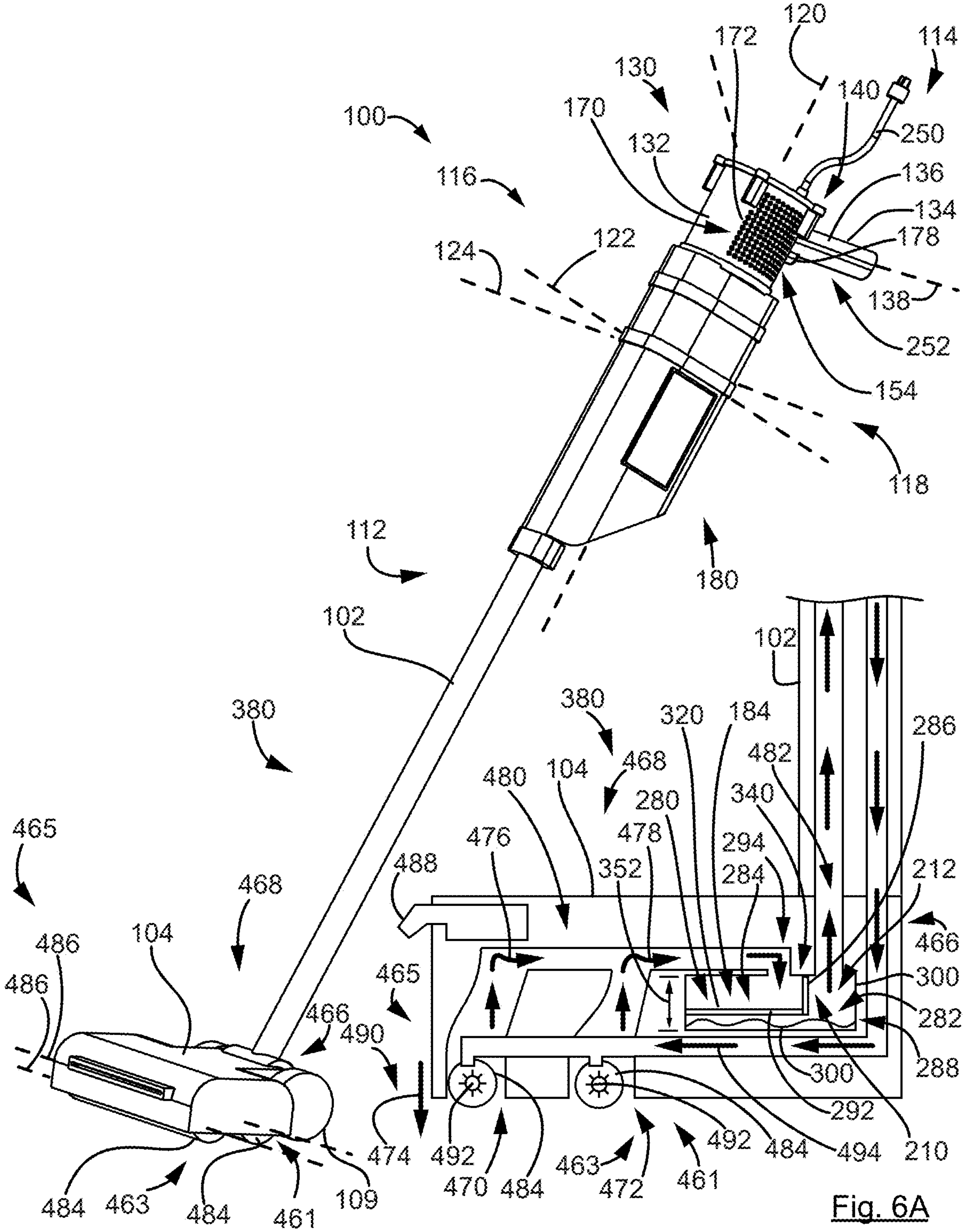
FIG. 6 is a top, front perspective view of a second surface cleaning apparatus, according to an embodiment.
FIG. 6A is a vertical and longitudinal cross sectional view of a surface cleaning head accessory that is attached to the surface cleaning apparatus of FIG. 6.
Figure 7:
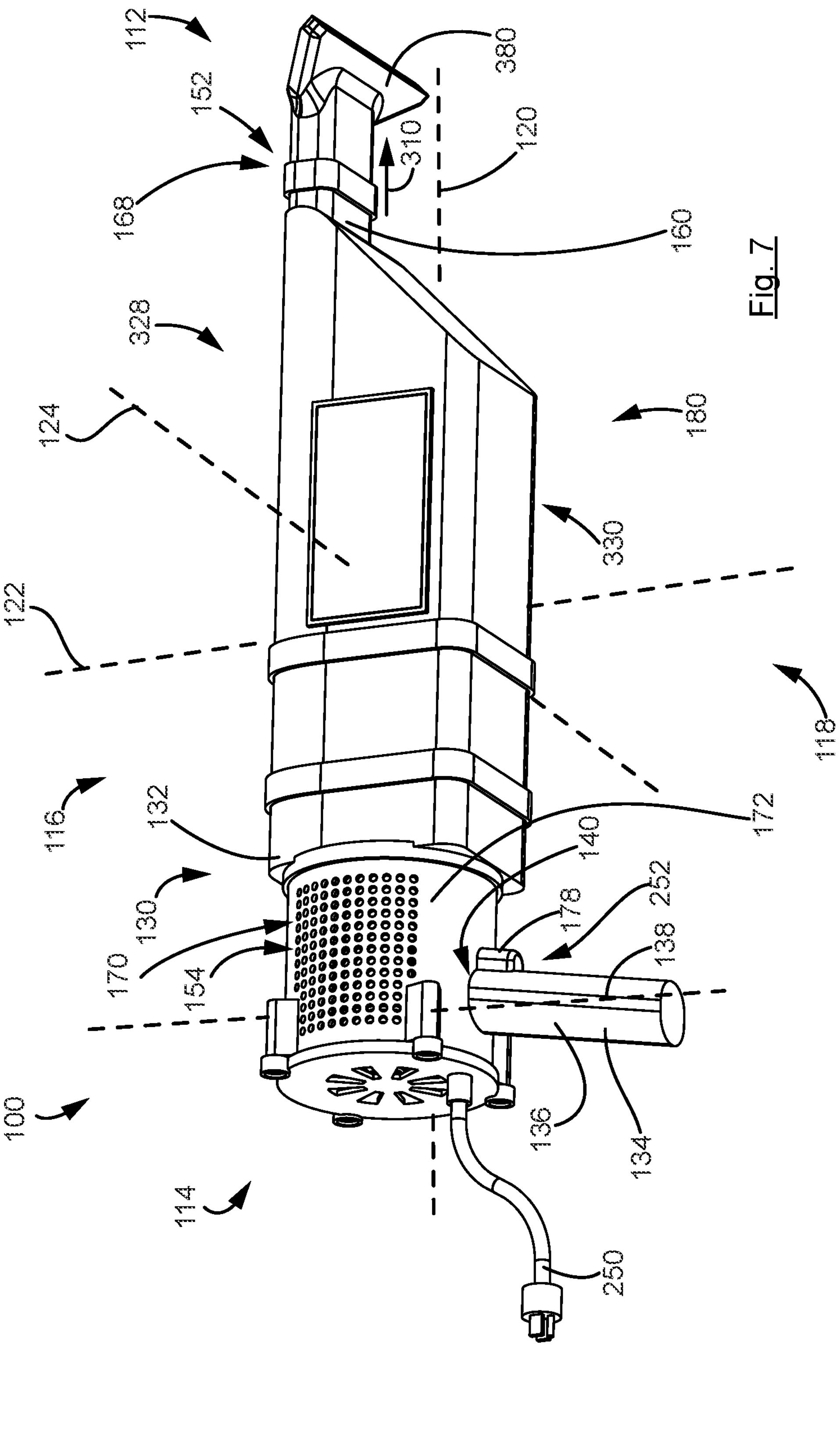
FIG. 7 is a bottom, rear perspective view of the surface cleaning apparatus of FIG. 6 removed from the wand.

The collection region flow opening 340, if formed as a port in a wall of the chamber 212, as example in FIG. 6A, will provide a liquid outlet flow path if the chamber is reoriented, even if the port is spaced from the bottom and/or front ends of the chamber. Accordingly, as exemplified in FIGS. 3 and 4, in some examples the collection region flow opening 340 is a port at an inward end 262 of an inwardly-projecting conduit 260. The inwardly-projecting conduit 260 extends into the separated material collection chamber 212 from a wall thereof. Accordingly, the collection region flow opening 340 is spaced from the wall of the chamber such that if the chamber is reoriented such that the wall forms a floor relative to gravity, liquid can be gathered against the wall without reaching the flow opening 340. Optionally, the inwardly-projecting conduit 260 extends through one of the solids collection chamber 280 and the liquids collection chamber 282 to open directly into the other of the solids collection chamber 280 and the liquids collection chamber 282. For example, the collection region flow opening 340 may include the air inlet port 206, and the air inlet may include an inwardly-projecting conduit 260 extending through the liquids collection chamber 282 to open directly into the solids collection chamber 280.

The collection region flow opening 340 may open through the inner chamber wall 292. The port of the collection region flow opening 340 may be provided in the inner chamber wall portion as exemplified by the air inlet port 206 at FIG. 8, or the inwardly-projecting conduit 260 of the collection region flow opening 340 may extend through the wall 292 as exemplified by the air inlet 202 in FIG. 3, and the port 206 is provided beyond the inner chamber wall 292. As exemplified in FIG. 3, the collection region flow opening 340 may open through a top wall portion 320*a* of the inner chamber wall 292. It will be appreciated that the portion of inner wall surrounding the port 206 or the conduit 260 may be porous or non-porous.

The surface cleaning apparatus 100 may be arranged with a non-reversing air flow path (e.g., air travels continuously in generally one direction such as generally rearwardly), at least for a downstream portion 370 thereof extending from an inlet port of the air treatment chamber (which may include the separated material collection region 210) to an outlet end of the air moving member. Each portion of the air flow path 150 (exemplified in FIG. 8) or the downstream portion 370 thereof (exemplified in FIG. 3) may include a common directional component, optionally a rearward directional component as exemplified in FIG. 8.

The axis of rotation 232 of the air moving member 220 may intersect the separated material collection region 210, the solids collection chamber 280, and/or the liquids collection chamber 282. However, it will be appreciated that other relative orientations of the collection chamber and the suction motor may be employed in other examples.

As exemplified in FIGS. 6A, the divided separated material collection chamber 212 may be provided in an accessory 380. The accessory 380 is selectively joinable to an air flow path 150. The accessory 380 may allow a surface cleaning apparatus that is not configured for wet cleaning to be selectively configured for wet cleaning by attaching or detaching the accessory 380. The divided separated material collection chamber 212 may be provided in a floor-supported component to reduce the weight (e.g., of water) that needs to be supported by the user. As exemplified, the accessory 380 may be a floor cleaning head. Alternately, for example, the air treatment assembly 180 of FIG. 1 may be removably mounted and may be an auxiliary cleaning tool.

Adjustable Division of the Separated Material Collection Region

The following is a description of an adjustable division of the separated material collection region 210. The inner chamber wall 292 is repositionable within the material collection region 210 between a first position and a second position.

A position of the inner chamber wall 292 may be adjustable to change the volume of the solid collection region and/or the liquids collection chamber. When the surface cleaning apparatus 100 is used primarily to collect solids (e.g., dirt, dust, hair, etc.), the solids collection chamber 280 may be expanded to accommodate the volume of solids. When the surface cleaning apparatus 100 is used primarily to collect liquids (e.g., water), the liquids collection chamber 282 may be expanded to provide further volume to contain liquids separately from solids (e.g., to allow the solids to dry before disposal).

As example in FIGS. 3 and 4, the inner chamber wall 292 (e.g., as a whole or a wall portion 320 thereof) is repositionable between a first position (FIG. 3) and a second position (FIG. 4). Optionally, the inner chamber wall 292 is biased to one of the positions (e.g., via a biasing member such as a spring or elastic member).

As exemplified in FIGS. 3 and 4, the inner chamber wall 292 or a wall portion 320 thereof may move as a rigid body. However, it will be appreciated that in some examples, the inner chamber wall 292 may flex between the first position and the second position, such as if one end of the inner chamber wall is moved linearly while the opposite end remains in a fixed position. As exemplified in FIGS. 3 and 4, the inner chamber wall 292 or a wall portion 320 thereof may translate between the first position and the second position. However, it will be appreciated that any suitable movement may be employed, for example the inner chamber wall 292 or a wall portion 320 thereof may rotate between the first and second positions about a fixed axis of rotation.

Moving the inner chamber wall 292 may include adjusting the spacing distance 302 between the facing wall 300 of the separated material collection chamber 212 and the porous portion 286 of the inner chamber wall 292. The spacing distance 302 is adjusted for at least a portion of the porous portion 286 (e.g., if an end of the porous portion rotates away from the facing wall 300), and optionally for all of the porous portion (e.g., if the porous portion translates away from the facing wall 300).

The inner chamber wall 292 may move between the first and second positions along a track 384. Optionally, the track 384 is a linear track. The track 384 may include a rail 386 carrying the inner chamber wall 292. The inner chamber wall 292 or a wall portion 320 thereof may include a wheel riding on the rail 386. However, it will be appreciated that any suitable structure to permit movement of the inner chamber wall 292 or wall portion 320 thereof may be employed. For example, a first end of a wall or wall portion may be rotationally driven while an opposite end slides across a smooth surface of the separated material collection chamber 212. Alternately, the a wall portion 320 may be provided with support struts that are raised and lowered to adjust the position of the wall portion 320.

Movement of the inner chamber wall 292 is driven by an actuator 270. For example, a handle may be drivingly connected to the inner chamber wall 292 and extend to an exterior of the surface cleaning apparatus 100 to be manipulated by a user. The user may rotate or translate the handle to adjust the position of the inner chamber wall 292. As exemplified, movement of the inner chamber wall 292 may also or alternatively be driven by a powered actuator 270. A powered actuator 270 may adjust the position of the inner chamber wall 292 in response to a user selection (e.g., between a solid pick-up mode and a liquid pick-up mode, optionally selected via the user interface 178) or automatically (e.g., in response to sensing a weight of the solids in the solids collection chamber 280 e.g., solids are packed to or above a predetermined weight or a level of solids in the solids collection chamber 280, e.g., solids are packed to or above a predetermined level). Optionally, the actuator 270 is a condition-responsive actuator. For example, the inner chamber wall 292 or a wall portion 320 thereof may be biased to the first position and moveable to the second position in response to a predetermined pressure exerted on an inner surface thereof (e.g., caused by packing of the solids against the inner surface).

Collection Region in the Air Flow Path

The following is a description of providing the separated material collection region 210 in the air flow path 150. The separated material collection region 210 is provided in an air treatment chamber, and the air treatment chamber is divided by the inner chamber wall 292.

Providing the separated material collection region 210 partially or fully nested in an air treatment chamber 184 reduces the number of chambers required in the surface cleaning apparatus 100. As exemplified in FIGS. 3 and 4, the air treatment chamber 184 is a momentum separator 184*a*. The momentum separator 184*a* is a mechanical or non-cyclonic momentum separator.

The air inlet 202 and air outlet 204 of the air treatment chamber 184 may each include a collection region flow opening 340 shaped and/or positioned to inhibit the movement of liquids out of the chamber through the air inlet 202 or air outlet 204 when the chamber is reoriented.

With the separated material collection region 210 in the air treatment chamber 184, each of the air treatment chamber air inlet 202 and the air treatment chamber air outlet 204 is open to the separated material collection region 210. The air inlet 202 extends into the solids collection chamber 280 to deliver solids as well as fluid (e.g., liquid and/or air) into the solids collection chamber 280. In some examples, as exemplified in FIG. 8, the air inlet 202 (i.e., the projecting conduit 260 thereof) extends through the liquids collection chamber 282 to open into the solids collection chamber 280 (i.e., without being open directly to the liquids collection chamber).

It will be appreciated that the air outlet 204 may open directly from the solids collection chamber as well, however, as exemplified in FIG. 8, the air outlet 204 may be separated from the solids collection chamber 280 by the porous portion 286 to inhibit the movement of solids to the air outlet 204. As exemplified, the air outlet 204 may open from the liquids collection chamber 282. Optionally, the air outlet 204 (i.e., the projecting conduit 260 thereof) extends through the solids collection chamber to open from the liquids collection chamber 282 (i.e., without being open directly to the solids collection chamber).

The air inlet 202 and/or air outlet 204 may open through the inner chamber wall 292. The port of the air inlet 202 and/or air outlet 204 may be provided in the inner chamber wall portion as exemplified by the air inlet port 206 at FIG. 8, or the inwardly-projecting conduit 260 of the air inlet 202 and/or air outlet 204 may extend through the wall portion 320 as exemplified by the air inlet 202 in FIGS. 3 and 4. As exemplified in FIGS. 3 and 4, the air inlet 202 and the air outlet 204 may each open through the inner chamber wall 292, and optionally both open through a common wall portion 320 of the inner chamber wall. As exemplified in FIGS. 3 and 4, the air inlet 202 and the air outlet 204 may each open through the top wall portion 320*a*.

The air treatment chamber 184 may redirect the air flow within the air treatment chamber 184 to encourage momentum-based material separation. It will be appreciated that the chamber may include one or more baffles to force air flow redirection. Also, or alternatively, as exemplified in FIGS. 3 and 4, air enters the air treatment chamber 184 in a first flow direction 390 and exits the air treatment chamber 184 in a second flow direction 392. As exemplified in FIGS. 3 and 4, the second flow direction 392 is different from the first flow direction 390. The second flow direction 392 extends at an angle to the first flow direction, and the angle may be at least 25°, at least 40°, at least 45°, or, as exemplified in FIGS. 3 and 4, about 180° (i.e., the first flow direction is generally opposite to the second flow direction).

Collection Region out of the Air Flow Path

The following is a description of providing the separated material collection region 210 outside of the air flow path 150. The separated material collection region 210 is communicatively coupled to the air flow path via a separated material outlet 214 from an air treatment chamber 184.

Providing the separated material collection region 210 outside the air flow path 150 may improve the performance of the surface cleaning apparatus 100. As exemplified in FIG. 13, the surface cleaning apparatus 100 includes an air treatment chamber 184 (e.g., a cyclone 184*b*) and the air treatment chamber includes a separated material outlet 214 leading into the separated material collection region 210. It will be appreciated that fluid liquid and solids will exit the cyclone 184*b* via the separated material outlet 214.

The air treatment member 184 may use any momentum air separator known in the art, which optionally may be a cyclone 184*b*. As air enters the air treatment member 184, heavier material, such as solids and liquids, are unable to change direction as quickly as the air and are therefore separated from the air stream. The separated material then exist the air treatment member 184 vie the separated material outlet 214. It will be appreciated that any air treatment member known in the art may be used and the cyclone may be any cyclone known in the art. As exemplified, the cyclone has an air inlet and an air outlet at the upper end thereof and a separated material outlet at the lower end. Alternately, the cyclone may have an air inlet and an air outlet at the lower end thereof and a separated material outlet at the upper end. Alternately, the cyclone may have an air inlet at one end and an air outlet and a separated material outlet at the axially opposed end.

The separated material outlet 214 may be any dirt outlet known in the art. Optionally, the separated material outlet 214 may include a collection region flow opening 340 shaped and/or positioned to inhibit the movement of liquids out of the chamber through the separated material outlet 214 when the chamber is reoriented.

In accordance with another aspect disclosed herein, instead of a typical dirt collection chamber for a cyclone, a separated material collection region 210 comprising a solids collection chamber and a liquids collection chamber may be provided. Any of the solids collection chamber and a liquids collection chamber discussed herein may be used.

Figure 13:
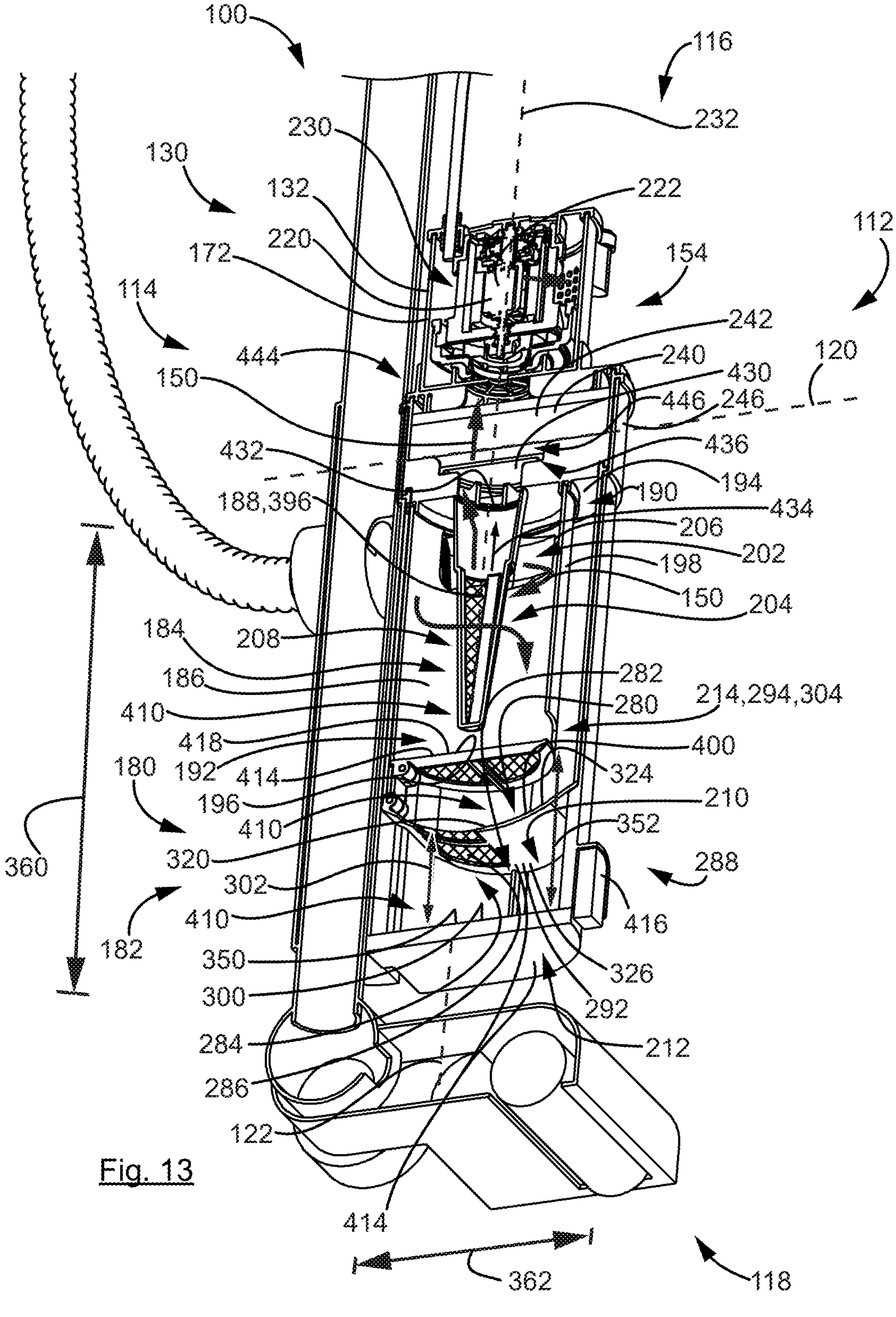
FIG. 13 is a vertical and longitudinal cross section perspective view of the surface cleaning apparatus of FIG. 11.

As exemplified in FIG. 13, the separated material outlet 214 opens into the separated material collection chamber directly above the inner chamber wall 292 when the surface cleaning apparatus 100 is in the in-use position (FIG. 12) and/or when the surface cleaning apparatus 100 is in the storage portion (FIG. 11).

As exemplified in FIG. 13, the separated material outlet 214 may be a lateral outlet opening through a sidewall of the cyclone and/or generally perpendicular to the cyclone axis of rotation 396 (with may be the same as the longitudinal axis 188 of the chamber).

In operation, liquid and solids will exit through the outlet 214. Solids will be retained in a solids collection chamber (exemplified as the upper dumpable chamber in FIG. 13) and liquid will flow through wall portion 320 into the liquids collection chamber (exemplified as the lower dumpable chamber in FIG. 13).

Impermeable Portions of the Inner Chamber Wall

The following is a description of an inner chamber wall 292 which includes one or more impermeable portions 400. The impermeable portions are impermeable to water, and may be impermeable to air. The impermeable portions may face a flow opening 340, the dirty air inlet 152, and/or the suction motor 220.

To discourage air or water flow from driving or drawing solids through the porous portion 286, portions of the inner chamber wall 292 may be impermeable (i.e., air-impermeable and/or water-impermeable). The impermeable portion 400 may be a solid wall (e.g., of a material forming walls of the air flow path 150, such as metal or plastic).

The impermeable portion 400 may include the portion of the inner chamber wall directly opposed to the air inlet 202 or air outlet 204, opposite the inlet or outlet in the direction in which air flows through the inlet or outlet. Accordingly, air is redirected between the inner chamber wall and the inlet or outlet.

Also, or alternatively, the impermeable portion 400 may include the portion of the inner chamber wall that is directly below an inlet via which material is introduced to the collection chamber when the surface cleaning apparatus 100 is in the in-use position and/or a storage position (e.g., an upright storage position of an upright vacuum, as exemplified in FIG. 11). Accordingly, water falling down from the inlet is unable to pass directly through the inner chamber wall.

As exemplified in FIGS. 3 and 4, the air inlet 202 or air outlet 204 may face a wall portion 320 that includes a porous portion 286 but the inlet or outlet faces an impermeable section 400 of the porous portion. As exemplified in FIG. 8, the air inlet or air outlet (the air outlet 204 as exemplified) faces a wall portion 320 that does not include a porous portion 286.

As exemplified in FIG. 8, the inner chamber wall 292 may include a rearward portion 320*d* that faces towards an air moving member 220, and the rearward portion is water impermeable. The air moving member 220 may have an axis of rotation 232 that intersects the inner solid collection chamber 280.

Separately Openable Collection Chambers

The following is a description of an inner chamber of the surface cleaning apparatus that is selectively openable for emptying of separated material while another chamber in which separated material is collected remains closed. Accordingly, separated material in the openable chamber may be disposed of while separated material in the closed chamber is retained. The type of separated material (e.g., liquid or solid) may be different between the chambers.

In some examples, the selectively openable chamber is a first of the solid and liquid collection chambers, which is openable while the other remains closed. For example, the liquid collection chamber may be selectively openable while the solid collection chamber remains closed, such as to allow liquid to be poured out of the liquid collection chamber while solids are contained. Optionally, the other of the solid and liquid collection chambers is subsequently openable when the first of the solid and liquid collection chambers is already open. However, in some examples, the liquid collection chamber and the solid collection chamber are each selectively openable while the other remains closed.

Figure 14:
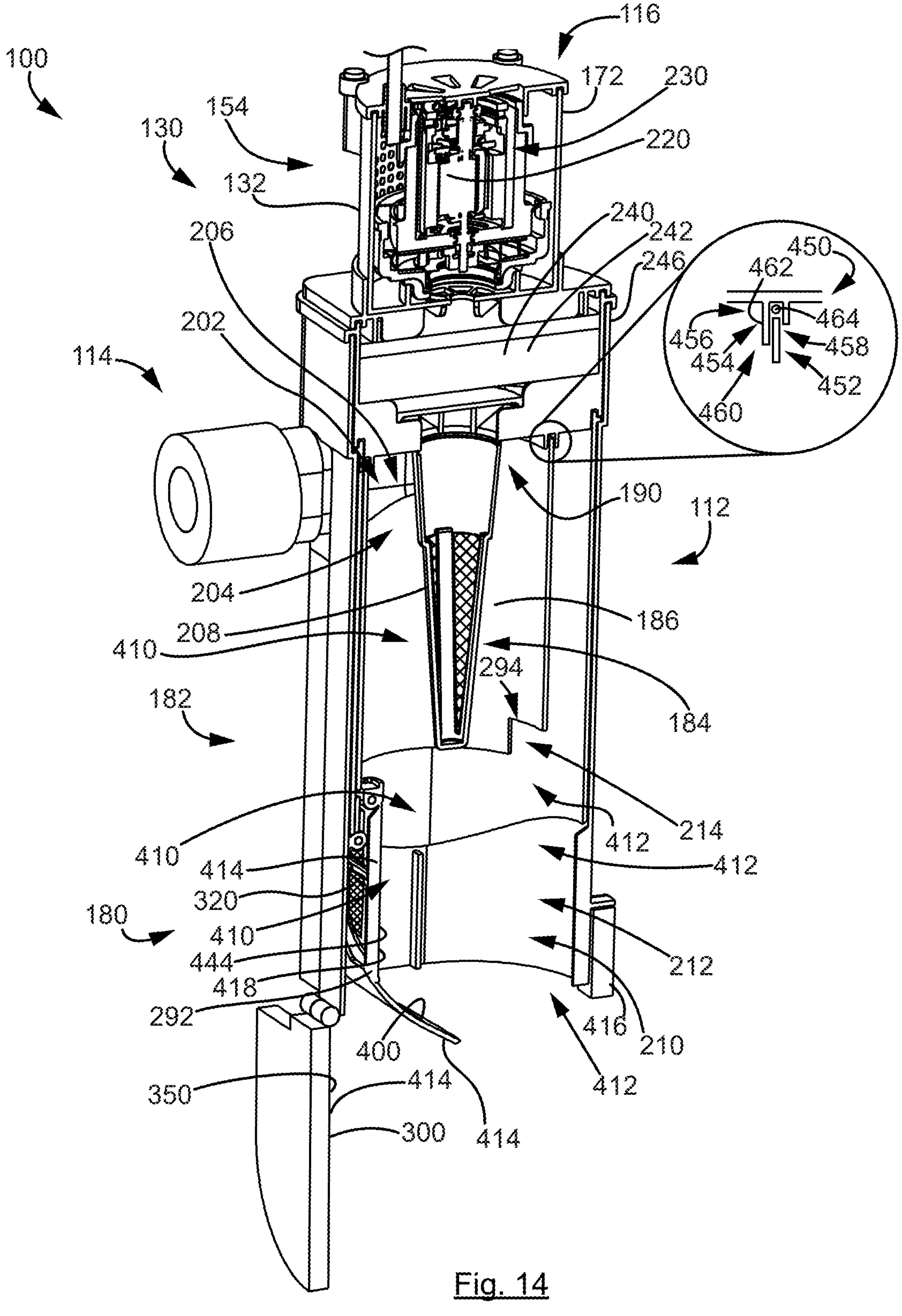
FIG. 14 is a vertical and longitudinal cross section perspective view of the surface cleaning apparatus of FIG. 11, with selectively openable doors in an open position.
Figure 15:
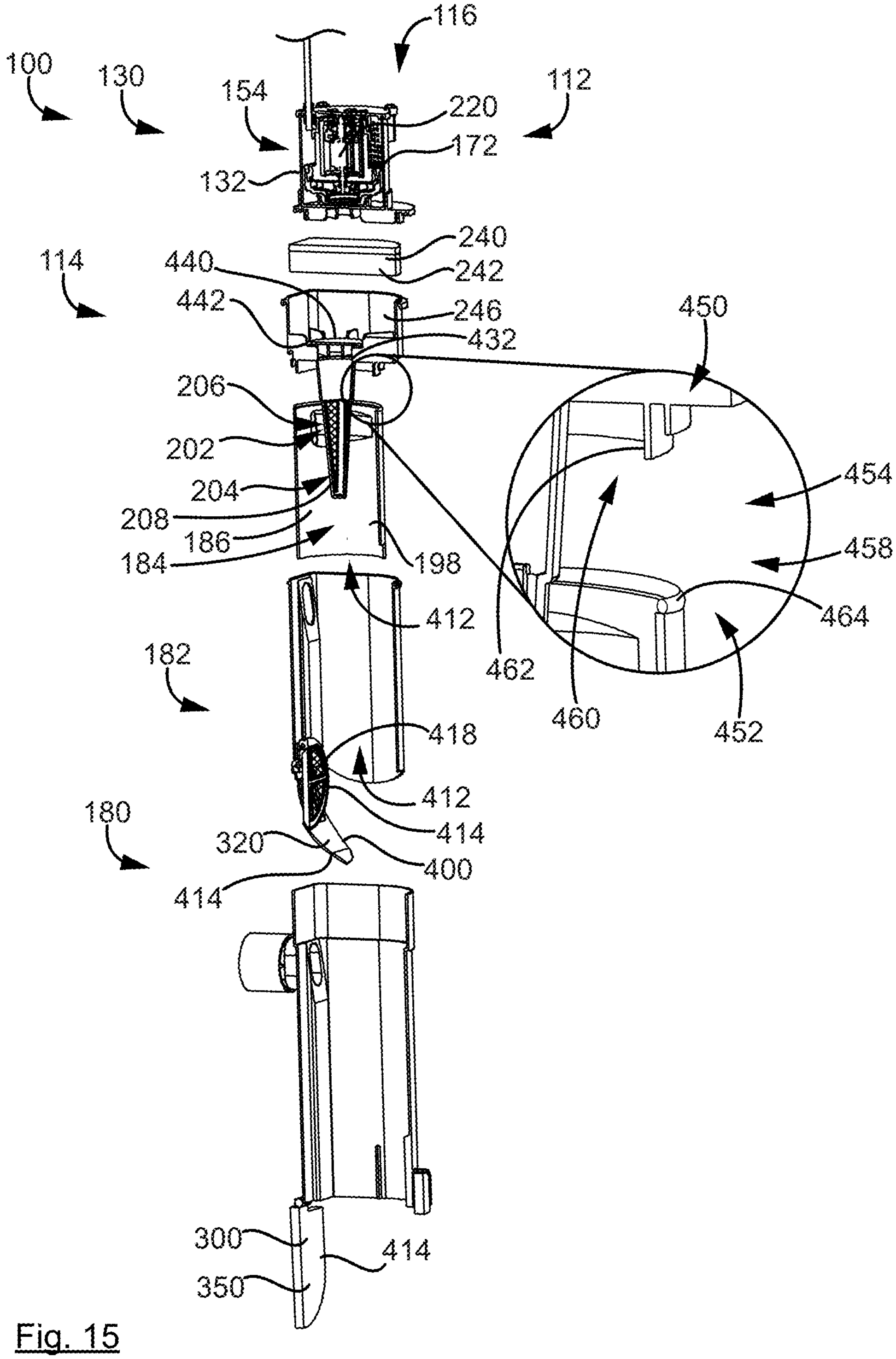
FIG. 15 is a vertical and longitudinal cross section perspective view of the cyclone bin of FIG. 11 with the cyclone bin removed; and, FIG. 16 is a transverse and longitudinal cross section perspective view of the surface cleaning apparatus of FIG. 11.

As exemplified in FIGS. 13 to 15, the surface cleaning apparatus 100 includes a plurality of dumpable chambers 410 in which separated material is collected. As exemplified in FIG. 13, the plurality of dumpable chambers 410 includes an upper solids collection chamber 280 and a lower liquids collection chamber 282, and may consist of these two chambers. In some examples, the dumpable chambers 410 also includes an air treatment chamber 184 (e.g., cyclone 184*b*) that is discrete from the solids and liquids collection chambers 280, 282.

Each dumpable chamber 410 includes a dumping opening 412 through which the chamber 410 can be emptied. The dumping opening 412 is selectively openable. The dumping opening 412 is selectively closed by a selectively openable door 414. The selectively openable door 414 may be a single-panel body as exemplified in FIGS. 13 to 15, or the door may include a portion of the surface cleaning apparatus 100 from which the collection chamber is removeable as exemplified in FIGS. 3 to 5. As exemplified in FIGS. 3 to 5, the collection chamber 212 may be selectively removeable from the main body housing 132, and the main body housing 132 may form the selectively openable door 414.

The door 414 is moveable between a closed position (FIG. 13) closing the dumping opening, and an open position (FIG. 14) in which the dumping opening is open. The door may be opened by an actuator, such as any of the actuator described herein. Optionally, the door is manually openable by manipulation of a handle (e.g., a raised handle or recessed handle) on the door 414. It will be appreciated that the door 414 may be openable in any suitable way, such as via a powered actuator.

Figure 5:
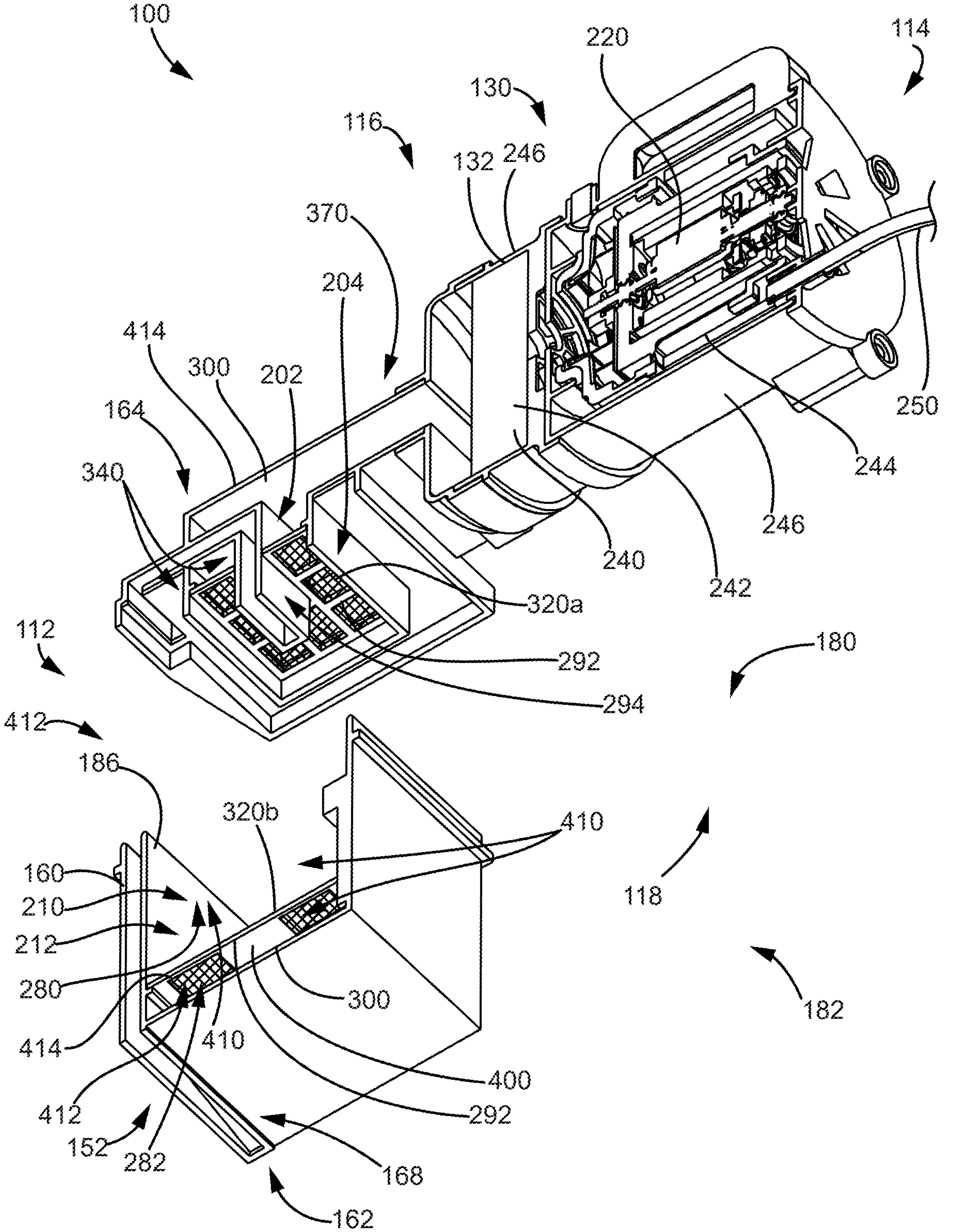
FIG. 5 is a vertical and longitudinal cross section perspective view of the surface cleaning apparatus of FIG. 1 in an open configuration.

The door 414 may be fully removed (i.e., detached) from the collection chamber 212 when in the open position, as exemplified in FIG. 5. Alternatively, the door 414 may be attached to the collection chamber 212 in each of the open and closed positions, such as attached via a hinge and rotatable between the closed and open positions as exemplified in FIG. 14.

The door 414 may be held in the closed position in any suitable way, such as via a friction fit. The door 414 may be held in the closed position by a releasable fastener 416, such as a clasp, magnetic fastener, or threaded fastener. Any suitable releasable fastener 416 may be used. The releasable fastener 416 may be released by an actuator, such as any of the actuators described herein. The releasable fastener may be released by user manipulation of a handle of the releasable fastener. The releasable fastener 416 may be biased to a closed position such as to fasten the door 414 automatically when the door 414 is moved to the closed position.

As exemplified in FIG. 5, a first 410*a* of the dumpable chambers 410 may be selectively openable while a second 410*b* of the dumpable chambers 410 remains closed. As exemplified in FIG. 5, optionally the second 410*b* of the dumpable chambers is only selectively openable while the first 410*a* of the dumpable chambers is open. For example, in FIG. 5 the liquids collection chamber is openable by lifting the inner chamber wall 292 only after the solids collection chamber 280 is opened by removing the treatment assembly 180 from the main body housing 132. As another example, in FIG. 10, the solids collection chamber 280 is openable by removing the rear wall portion 320*d* only after the liquids collection chamber 282 is opened by removing the treatment assembly 180 from the main body housing 132. However, it will be appreciated that in some examples the first of the dumpable chambers is selectively openable while the second of the dumpable chambers remains closed and the second of the dumpable chambers is selectively openable while the first of the dumpable chambers remains closed.

In embodiments in which a collection chamber 212 is separate from an air treatment chamber 184, the air treatment chamber 184 may be selectively openable while one or both of the solids collection chamber and the liquids collection chamber remain closed. As exemplified in FIGS. 13 and 14, the air treatment chamber 184 is selectively openable while the liquids collection chamber 282 remains closed. Optionally, one of the solids collection chamber and the liquids collection chamber must be open to open the air treatment chamber.

As exemplified in FIGS. 13 and 14, opening one or both of the solids collection chamber 280 and the liquids collection chamber 282 may include or consist of moving the inner chamber wall 292. The inner chamber wall 292 may include or form the selectively openable door 414 of a dumpable chamber 410. The dumping door 414 may consist of the inner chamber wall 292 or a wall portion 320 thereof.

As exemplified in FIG. 13, in operation to clean a surface, the air treatment chamber 184 has an air treatment chamber lower wall 418 (which may be one of the end walls 194, 196) which is openable. The air treatment chamber lower wall 418 forms or includes the dumping door 414. The dumping door 414 may consist of the air treatment chamber lower wall 418. The air treatment chamber lower wall 418 is rotationally mounted to the sidewall 198 between a closed operating position (FIG. 13) and an open emptying position (FIG. 14), and the inner chamber wall 292 is also rotationally mounted between a closed operating position (FIG. 13) and an open emptying position (FIG. 14).

It will be appreciated that cyclone 184*b*, solids collection chamber and liquids collection chamber may open sequentially. For example, a user may move an actuator to a first position that opens the liquids collection chamber lower wall. The user may then move the actuator to a second position that opens the lower wall of the solids collection chamber. The user may then move the actuator to a third position that opens the lower wall of the cyclone 184*b*. Optionally, two or more of the cyclone 184*b*, solids collection chamber and liquids collection chamber may open concurrently, for example, the lower walls of the solids collection chamber and the cyclone may open concurrently.

In some examples, at least one (and optionally only one) of the solids collection chamber 280 and the liquids collection chamber 282 and a discrete air treatment chamber 184 are concurrently openable. The separated material in the air treatment chamber 184 may be primarily solids. In some examples, the solids collection chamber 280 and the discrete air treatment chamber 184 are concurrently openable while the liquids collection chamber 282 remains closed.

Impact Surface

The following is a description of an impact surface facing an outlet port of an air outlet of an air treatment member. The impact surface assists in separating material from the air flow. The surface may be shaped to prevent liquids from moving downstream past the impact surface. The impact surface may be a recessed surface, such as surrounded by a projecting periphery projecting in a direction opposite to a direction of air flow through the outlet port of the air outlet. The impact surface may be a surface of a baffle plate which extends generally transversely to a direction of air flow through the air treatment chamber air outlet.

Figure 16:
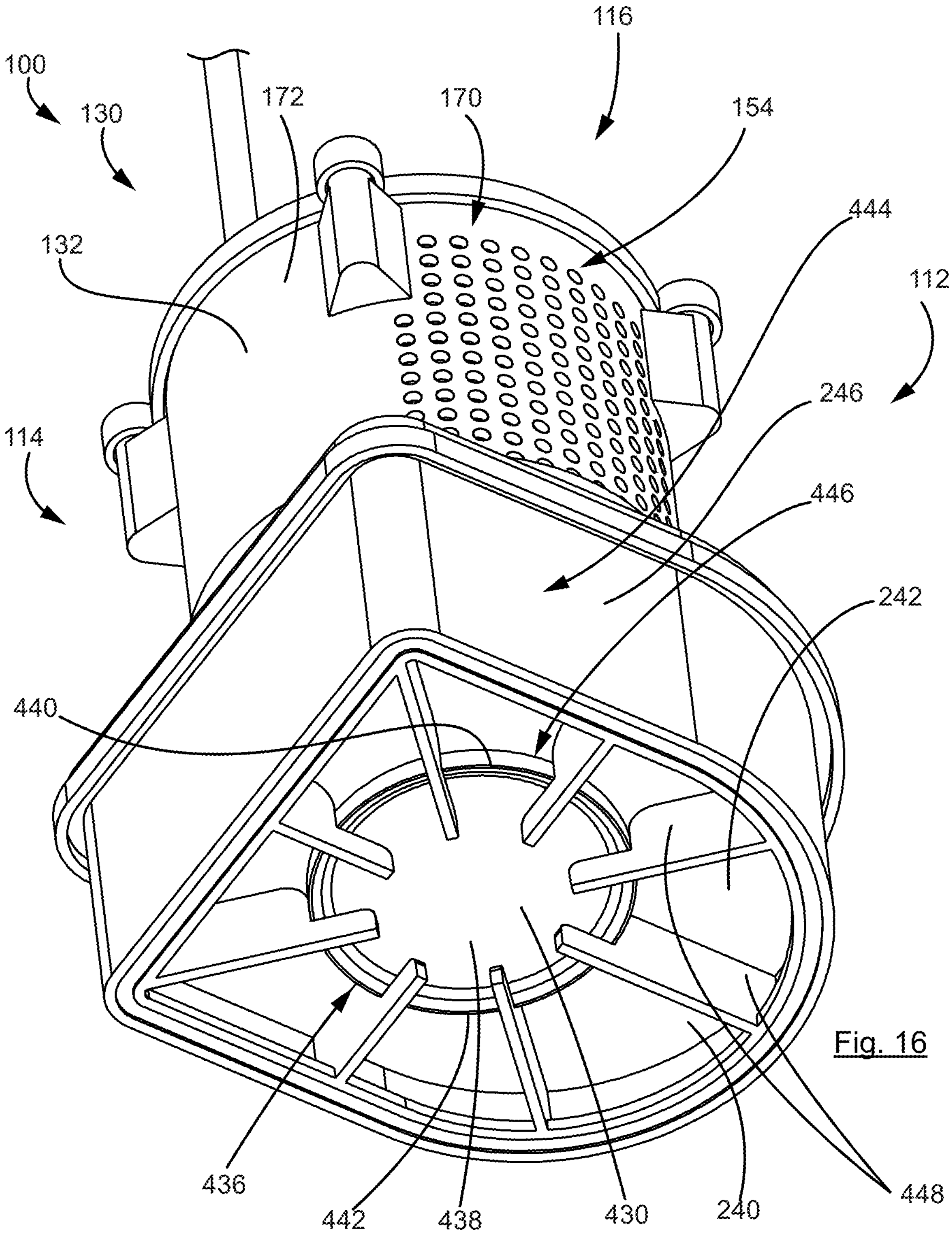

As exemplified in FIGS. 13 and 16 the air outlet 204 of the air treatment chamber 184 may include an impact surface 430 facing an outlet port 432 of the air outlet 204. The impact surface 430 extends generally transversely to a direction 434 of air flow through the air treatment chamber air outlet 204. It will be appreciated that the impact surface 430 may extend at any angle to air flow travelling towards and impacting the impact surface 430 that inhibits or reduces entrained liquid in the air flow impacting the impact surface 430 from flowing across and around the impact surface to continue downstream.

Optionally, the impact surface 430 may be arranged directly opposite (facing) the outlet port 432 of the air outlet 204 such that air traveling through the air outlet 204 is directed at the impact surface. The air flow path 150 continues around the baffle plate (e.g., towards the pre-motor filter and/or air moving member 220). The impact surface 430 overlies the outlet port 432. The impact surface 430 may be directly above the outlet port 432 when the surface cleaning apparatus 100 is in the in-use position. Accordingly, liquid separated by the impact surface 430 may fall downwardly into the cyclone whereupon it may exit through the outlet 214.

The impact surface 430 may be a recessed surface to better prevent separated material from flowing across the surface and off the edge of the surface in the downstream direction. As exemplified, a projecting periphery 436 may surround the impact surface 430. The projecting periphery 436 projects out from the impact surface in a direction opposite to the direction 434 of air flow through the outlet port 432.

The impact surface 430 may extend generally perpendicular to an axis of rotation 232 of an air moving member 220 and/or an axis of rotation 396 of a cyclone air treatment chamber 184*b*. Optionally, one or both of the axis of rotation 232 of the air moving member 220 and the axis of rotation 396 of the cyclone air treatment chamber 184*b* intersects the impact surface 430.

As exemplified, the impact surface may be a surface of a baffle plate 438. The baffle plate 438 includes the impact surface 430 and an opposed surface 440. The baffle plate may include a descending wall portion 442 forming the projecting periphery 436. The baffle plate 438 may be a generally circular plate, as exemplified. The baffle plate 438 may be supported in a header space downstream of the air outlet 204 by one or more supports 448 (e.g., struts). The supports 448 may also support the pre-motor filter 242, as exemplified.

The air flow path 150 may include a post-baffle plate portion 444 that has an inlet port 446 that faces the opposed surface 440 of the baffle plate 438. Accordingly, the air flow path 150 extends outwardly around the baffle plate 438 and then back inwardly to the inlet port 446 facing the opposed surface. As exemplified, optionally the inlet port 446 is at an upstream end of a pre-motor filter housing 246.

Shielded Junction

The following a description of shielding a juncture between separable portions of a chamber. The chamber is an openable chamber, and is opened by moving separable portions of the chamber apart. When the separable portions are together, they meet at a juncture, and a shielding wall extends across the juncture.

The shielding wall blocks air from being driven directly at the juncture. The juncture may be opposite an air inlet into the chamber. The juncture may face the air inlet and may extend generally transverse to the direction of air flow through the air inlet. Shielding the juncture inhibits the driving of air through the juncture.

As exemplified in FIGS. 14 and 15, a chamber (e.g., the air treatment chamber 184) includes first and second separable portions 450, 452. The second portion is moveable between a closed position (FIG. 14) and an open position (FIG. 15).

The first and second separable portions 450, 452 abut at juncture 454 when closed together. The first portion 450 has a first abutment end 456 and the second portion 452 has a second abutment end 458. As exemplified, one of the first and second abutment ends 456, 458 may include a U-shaped channel 460 and the other of the first and second abutment ends 456, 458 is receivable in the U-shaped channel 460 to form the juncture 454 when the second portion 452 is in the closed position. Any abutment end may be used and, optionally a gasket or other sealing member may be used.

As example in FIGS. 14 and 15, the juncture 454 is shielded. A wall member 462 overlies the juncture 454. As exemplified, a portion of the chamber is located between the wall member and the juncture. As exemplified, the wall member 462 may be part of one of the first and second portions 450, 452. The wall member 462 may form a wall of the U-shaped channel 460. The wall member 462 may overly the abutment end of the first and second portions 450, 452 that is received in the U-shaped channel 460. The wall member 462 may include an inner portion of the U-shaped channel 460 within the chamber.

The air treatment chamber 184 includes an air inlet 202. As exemplified in FIGS. 14 and 15, the air inlet 202 directs fluid that is entering the chamber 184 in an inlet direction 390. The inlet direction 390 may be towards the wall member 462. The air inlet 202 includes an outlet port 206 on a first side of the air treatment chamber 184, and when the second portion 452 is in the closed position the wall member 462 is provided on an opposed side of the air treatment chamber 184.

In some examples, when the second portion is in the closed position, the outlet port 206 of the air inlet 202 faces the wall member 462. The outlet port 206 of the air inlet 202 may directly face the wall member 462 when the second portion 452 is closed (i.e., no other component of the apparatus, such as the air outlet 204 of the chamber, is between the outlet port 206 and the wall member 462).

As exemplified in FIGS. 14 and 15, the surface cleaning apparatus 100 may include a deformable seal member 464. The deformable seal member 464 may be part of the abutment end of one of the first and second portions 450, 452. When the second portion 452 is in the closed position, the seal member 464 may be positioned between the first and second portions 450, 452 and the wall member 462 is positioned in the air treatment chamber 184 overlying the juncture 454. As exemplified, the seal member 464 may be positioned in the U-shaped channel when the second portion 452 is in the closed position.

A Plurality of Inlet Nozzles

The following is a description of a surface cleaning apparatus or an accessory thereof having a plurality of inlet nozzles. The inlet nozzles are arranged to be concurrently applied to a surface to be cleaned (e.g., a floor below). The nozzles may be formed in a floor cleaning head accessory.

A plurality of inlet nozzles allows different nozzles to be provided for different separable material (i.e., material with different characteristics). Different nozzles, and optionally the air flow path extending from them, may be shaped and/or positioned differently, and different shapes and/or positions may be selected for different types of material (e.g., solids vs. liquids, fines vs. larger solids, etc.). In some examples, the inlet nozzles may be separated by a brush roll with each of the inlet nozzles and the brush roll arranged to be concurrently applied to a surface to be cleaned.

As exemplified in FIGS. 6 and 6A, the surface cleaning apparatus 100 includes a cleaning member 461. The cleaning member 461 may provided at a lower end 463 of a floor cleaning head 104. The floor cleaning head 104 has a front end 465, a rear end 466, an upper end 468, and the lower end 463. The cleaning member 461 may be a detachable accessory for a surface cleaning apparatus 100. Optionally, the cleaning member 461 is part of a floor cleaning head of an upright vacuum (e.g., below an upright portion in which the air moving member is provided). In some examples, the surface cleaning head 104 is an accessory for, e.g., a hand vacuum cleaner.

The cleaning member 461 includes a first inlet nozzle 470 and a second, discrete inlet nozzle 472. The first and second inlet nozzles 470, 472 are arranged to be concurrently applied to the surface to be cleaned. The first and second inlet nozzles 470, 472 may be directed in a common direction 474, e.g., the floor as exemplified. The second inlet nozzle 472 may be rearward of the first inlet nozzle 470.

As exemplified in FIG. 6A, a first air flow path 476 extends downstream from the first dirty air inlet 470 and a second air flow path 478 extends downstream from the second dirty air inlet 472. The first air flow path 476 may include a portion 480 that extends over the cleaning member 461 when the head 104 is positioned on a floor with the cleaning member 461 facing the floor. The first and second air flow paths 476, 478 may merge downstream of the nozzles and upstream of a clean air outlet 154. As exemplified, the first and second air flow paths 476, 478 may merge upstream of an air outlet 482 from the head 104.

As exemplified, the cleaning member 461 includes a rotatably mounted brush 484. The rotatably mounted brush 484 is arranged to be concurrently applied to a common surface along with the first and second inlet nozzles 470, 472. The rotatably mounted brush 484 may be mounted between the first and second inlet nozzles 470, 472 or as part of one of the nozzles. The brush 484 has a brush axis of rotation 486. The axis of rotation 486 of the brush may extend generally horizontally when the cleaning head 104 is positioned on a floor with the cleaning member 461 facing the floor (e.g., with the upper end 468 above the lower end 463). The axis of rotation 486 may extend generally parallel to the front end 465 of the cleaning head 104 when the cleaning head 104 is positioned on a floor with the cleaning member facing the floor.

Optionally, as exemplified, the cleaning member 461 includes two rotatably mounted brushes 484, each rotatably mounted brush 484 having a brush axis of rotation 486. The brush axes of rotation 486 may be generally parallel to one another. Each brush axis of rotation 486 may extend horizontally and generally parallel to the front end 465 of the surface cleaning head 104 when the surface cleaning head 104 is positioned on a floor.

As exemplified in FIG. 6A, the head 104 may include a spray nozzle 488. The spray nozzle 488 may be directed at a location 490 forward of the front end 465 of the head 104 and/or at a brush.

As exemplified in FIG. 6A, an optional air turbine 492 may be drivingly connected to a rotatably mounted brush 484 to drive rotation of the brush 484 about the axis of rotation 486. The air turbine 492 is in a turbine air flow path 494 which extends through an air moving member, such as through the air moving member 220 of the main air flow path 150. Optionally, the turbine air flow path 494 is discrete from the main air flow path 150. The turbine 492 is rotated by airflow through the turbine air flow path 494, and rotation of the turbine rotates the brush 484.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clause Set A

1. A surface cleaning apparatus comprising:
   - (a) an air flow path from a dirty air inlet to a clean air outlet;
   - (b) a momentum separator positioned downstream of the dirty air inlet, the momentum separator comprising an outer liquid collection chamber and an inner solid collection chamber that is positioned within the outer liquid collection chamber; and, (c) a suction motor positioned downstream from the momentum separator, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, and wherein a downstream air flow path extends from the inner solid collection chamber to the suction motor and the porous portion of the inner chamber wall connects the inner solid collection chamber in fluid communication with the downstream air flow path, and wherein the inner solid collection chamber and the outer liquid collection chamber are separately openable.

2. The surface cleaning apparatus of clause 1 wherein the inner solid collection chamber is suspended inside the outer liquid collection chamber.

3. The surface cleaning apparatus of clause 1 wherein the inlet conduit extends through the outer liquid collection chamber to the inner solid collection chamber.

4. The surface cleaning apparatus of clause 1 wherein the inner wall comprises an upper wall portion, a lower wall portion and side wall portions and at least two of the wall portions comprise porous portions.

5. The surface cleaning apparatus of clause 4 wherein the dirty air inlet is provided at a front end of the surface cleaning apparatus, the side wall comprises a front wall that is positioned rearwardly of a front wall of the outer liquid collection chamber and the front wall of the inner solid collection chamber comprises one of the porous portions.

6. The surface cleaning apparatus of clause 1 wherein air travelling through the inlet conduit enters the inner solid collection chamber in a first flow direction and air exits the inner solid collection chamber is a second flow direction that is different to the first flow direction.

7. The surface cleaning apparatus of clause 6 wherein the second flow direction is generally in an opposite direction to the first direction.

8. The surface cleaning apparatus of clause 6 wherein the second flow direction is at an angle of at least 45° to the first direction.

9. The surface cleaning apparatus of clause 1 wherein the inner wall comprises a rearward portion that faces towards the suction motor and the rearward portion is water impermeable.

10. The surface cleaning apparatus of clause 9 wherein the suction motor has an axis of rotation and the axis of rotation intersects the inner solid collection chamber.

11. A surface cleaning apparatus comprising:

(a) an air flow path from a dirty air inlet to a clean air outlet with a motor and fan assembly positioned in the air flow path;

(b) an air treatment chamber positioned downstream of the dirty air inlet, the air treatment chamber comprising an air treatment chamber air inlet, an air treatment chamber air outlet and a separated material outlet; and, (c) a separated material collection chamber comprising a solid collection region and a liquid collection region, the liquid collection region is in communication with the solid collection region through a porous member, wherein material separated in the air treatment chamber enters the solid collection region through the separated material outlet and liquid that is part of the material separated in the air treatment chamber enters the liquid collection region through the porous member.

12. The surface cleaning apparatus of clause 11 wherein the liquid collection region and the solid collection region are emptyable concurrently.

13. The surface cleaning apparatus of clause 11 wherein the air treatment chamber, the solid collection region and the air treatment chamber are emptyable concurrently.

14. The surface cleaning apparatus of clause 11 wherein the liquid collection region and the solid collection region are emptyable separately.

15. The surface cleaning apparatus of clause 11 wherein, in operation to clean a surface, the separated material collection chamber is positioned at a lower elevation than the air treatment chamber.

16. The surface cleaning apparatus of clause 11 wherein the air treatment chamber comprises a cyclone chamber.

17. The surface cleaning apparatus of clause 11 wherein, in operation to clean a surface, the air treatment chamber has an air treatment chamber lower wall which is openable and the porous member and the air treatment chamber lower wall are rotationally mounted between a closed operating position and an open emptying position.

18. The surface cleaning apparatus of clause 17 wherein, in operation to clean a surface, the liquid collection region has a liquid collection region lower wall which is openable and the liquid collection region lower wall is rotationally mounted between a closed operating position and an open emptying position.

19. The surface cleaning apparatus of clause 18 wherein the liquid collection region lower wall, the porous member and the air treatment chamber lower wall are concurrently openable.

20. The surface cleaning apparatus of clause 18 wherein the liquid collection region lower wall is openable separately from the porous member and the air treatment chamber.

21. The surface cleaning apparatus of clause 11 wherein the air treatment chamber and the separated material chamber comprise an air treatment assembly that is removably mounted to the surface cleaning apparatus.

Clause Set B

1. An upright surface cleaning apparatus comprising:

(a) an air flow path from a dirty air inlet to a clean air outlet with a motor and fan assembly positioned in the air flow path;

(b) a surface cleaning head having the dirty air inlet;

(c) an upright section moveable mounted to the surface cleaning head between an upright storage position and a reclined operating position, the upright section comprising an air treatment assembly;

(d) the air treatment assembly comprising an air treatment chamber positioned downstream of the dirty air inlet, the air treatment chamber comprising an air treatment chamber air inlet, an air treatment chamber air outlet and a separated material outlet; and, (e) the air treatment assembly further comprises a separated material collection chamber comprising a solid collection region and a liquid collection region, wherein, when the upright section is in the storage position, the solid collection region is positioned below the air treatment chamber and the liquid collection region is positioned below the solid collection region and the liquid collection region is in communication with the solid collection region through a porous member.

2. The surface cleaning apparatus of clause 1 wherein the liquid collection region and the solid collection region are emptyable concurrently.
3. The surface cleaning apparatus of clause 1 wherein the air treatment chamber, the solid collection region and the air treatment chamber are emptyable concurrently.
4. The surface cleaning apparatus of clause 1 wherein the liquid collection region and the solid collection region are emptyable separately.
5. The surface cleaning apparatus of clause 1 wherein the air treatment chamber and the solid collection region are emptyable concurrently and the liquid collection region is separately emptyable.
6. The surface cleaning apparatus of clause 1 wherein the air treatment chamber comprises a cyclone chamber and, when the upright section is in the storage position, the air treatment chamber air inlet and the air treatment chamber air outlet are provided at an upper end of the cyclone.
7. The surface cleaning apparatus of clause 6 wherein, when the upright section is in the storage position, the separated material outlet is provided at a lower end of the cyclone.
8. The surface cleaning apparatus of clause 1 wherein, when the upright section is in the storage position, the air treatment chamber has an air treatment chamber lower wall which is openable and the porous member and the air treatment chamber lower wall are rotationally mounted between a closed operating position and an open emptying position.
9. The surface cleaning apparatus of clause 8 wherein, when the upright section is in the storage position, the liquid collection region has a liquid collection region lower wall which is openable and the liquid collection region lower wall is rotationally mounted between a closed operating position and an open emptying position.
10. The surface cleaning apparatus of clause 9 wherein the liquid collection region lower wall, the porous member and the air treatment chamber lower wall are concurrently openable.
11. The surface cleaning apparatus of clause 9 wherein the liquid collection region lower wall is openable separately from the porous member and the air treatment chamber.
12. The surface cleaning apparatus of clause 1 wherein the air treatment chamber and the separated material chamber comprise an air treatment assembly that is removably mounted to the surface cleaning apparatus.
13. The surface cleaning apparatus of clause 1 wherein, when the upright section is in the storage position, the air treatment chamber air inlet is provided at an upper end of the air treatment chamber and the air treatment chamber air outlet comprises a baffle plate that extends generally transversely to a direction of flow through the air treatment chamber air outlet.
14. The surface cleaning apparatus of clause 13 wherein the baffle plate has an impact surface and an opposed surface and the air treatment chamber air outlet comprises an outlet air flow conduit having an outlet port and the impact surface of the baffle plate is positioned overlying and facing the outlet port.
15. The surface cleaning apparatus of clause 14 wherein the air flow path comprises a post baffle plate portion that has an inlet port that faces the opposed surface of the baffle plate.
16. The surface cleaning apparatus of clause 14 wherein the impact surface of the baffle plate has a descending wall positioned radially outwardly of the outlet port of the outlet air flow conduit.
17. A surface cleaning apparatus comprising:
   (a) an air flow path from a dirty air inlet to a clean air outlet with a motor and fan assembly positioned in the air flow path;
   (b) an air treatment chamber positioned downstream of the dirty air inlet, the air treatment chamber comprising an air treatment chamber air inlet, an air treatment chamber air outlet and a separated material outlet; and,
   (c) a separated material collection chamber comprising a solid collection region and a liquid collection region, wherein, when the surface cleaning apparatus is in operation to clean a surface, the air treatment chamber air inlet is provided at an upper end of the air treatment chamber and the air treatment chamber air outlet comprises a baffle plate that extends generally transversely to a direction of flow through the air treatment chamber air outlet.
18. The surface cleaning apparatus of clause 17 wherein the baffle plate has an impact surface and an opposed surface and the air treatment chamber air outlet comprises an outlet air flow conduit having an outlet port and the impact surface of the baffle plate is positioned overlying and facing the outlet port.
19. The surface cleaning apparatus of clause 18 wherein the air flow path comprises a post baffle plate portion that has an inlet port that faces the opposed surface of the baffle plate.
20. The surface cleaning apparatus of clause 18 wherein the impact surface of the baffle plate has a descending wall positioned radially outwardly of the outlet port of the outlet air flow conduit.

Clause Set C

1. A surface cleaning apparatus comprising:
   (a) an air flow path from a dirty air inlet to a clean air outlet;
   (b) a momentum separator positioned downstream of the dirty air inlet, the momentum separator comprising a liquid collection chamber and a solid collection chamber; and,
   (c) a suction motor positioned downstream from the momentum separator, wherein the solid collection chamber is separated from the liquid collection chamber by a chamber wall, and at least a portion of the chamber wall comprises a porous portion and connects the solid collection chamber in fluid communication with the liquid collection chamber, and wherein the liquid collection chamber has a facing wall that faces the porous portion, the porous portion is moveable with respect to the facing wall between a first operating position in which the liquid collection chamber has a first volume and the surface cleaning apparatus is operable to clean a surface, and a second operating position in which the liquid collection chamber has a first volume and the surface cleaning apparatus is operable to clean the surface, wherein the second volume is larger than the first volume.

2. The surface cleaning apparatus of clause 1 wherein the porous portion is moveable mounted.
3. The surface cleaning apparatus of clause 1 wherein, when the surface cleaning apparatus is in operation to clean a surface, the facing wall is positioned below the porous portion.
4. The surface cleaning apparatus of clause 3 wherein, when the surface cleaning apparatus is in operation to clean a surface, the porous portion comprises a lower wall of the solid collection chamber.
5. The surface cleaning apparatus of clause 4 wherein the solid collection chamber has a solid collection chamber air inlet and, when the surface cleaning apparatus is in operation to clean a surface, the solid collection chamber air inlet is positioned in an upper end of the solid collection chamber.
6. The surface cleaning apparatus of clause 5 wherein, when the surface cleaning apparatus is in operation to clean a surface, the facing wall is positioned below the porous portion.
7. The surface cleaning apparatus of clause 6 wherein, when the surface cleaning apparatus is in operation to clean a surface, the porous portion comprises a lower wall of the solid collection chamber.
8. The surface cleaning apparatus of clause 4 wherein the solid collection chamber has a solid collection chamber air outlet and, when the surface cleaning apparatus is in operation to clean a surface, the solid collection chamber air outlet is positioned in an upper end of the solid collection chamber.
9. The surface cleaning apparatus of clause 8 wherein, when the surface cleaning apparatus is in operation to clean a surface, the facing wall is positioned below the porous portion.
10. The surface cleaning apparatus of clause 9 wherein, when the surface cleaning apparatus is in operation to clean a surface, the porous portion comprises a lower wall of the solid collection chamber.
11. The surface cleaning apparatus of clause 5 wherein the solid collection chamber has a solid collection chamber air outlet and, when the surface cleaning apparatus is in operation to clean a surface, the solid collection chamber air outlet is positioned in an upper end of the solid collection chamber.
12. The surface cleaning apparatus of clause 11 wherein, when the surface cleaning apparatus is in operation to clean a surface, the facing wall is positioned below the porous portion.
13. The surface cleaning apparatus of clause 12 wherein, when the surface cleaning apparatus is in operation to clean a surface, the porous portion comprises a lower wall of the solid collection chamber.
14. The surface cleaning apparatus of clause 1 wherein the solid collection chamber is a non-cyclonic momentum separator.
15. The surface cleaning apparatus of clause 1 wherein the solid collection chamber has a solid collection chamber air inlet, the solid collection chamber air inlet has an outlet port that faces the porous portion and a section of the porous portion that faces the outlet is air impermeable.
16. The surface cleaning apparatus of clause 1 wherein the solid collection chamber has a solid collection chamber air inlet, the porous portion comprises a screen, the solid collection chamber air inlet has an outlet port that faces the screen and a section of the screen that faces the outlet is air impermeable.

Clause Set D

1. A surface cleaning apparatus comprising:
   (a) an air flow path from a dirty air inlet to a clean air outlet with a suction motor positioned in the air flow path; and,
   (b) an air treatment chamber positioned downstream of the dirty air inlet, the air treatment chamber having an air treatment chamber air inlet and an air treatment chamber air outlet, wherein the air treatment chamber has a first portion and a second portion, the second portion is moveable between a closed position and an open emptying position, wherein, when the second portion is in the closed position, the first portion and the second portion abut along a juncture and a wall member is positioned in the air treatment chamber overlying the juncture.
2. The surface cleaning apparatus of clause 1 wherein the air treatment chamber air inlet directs fluid entering the air treatment chamber towards the wall member.
3. The surface cleaning apparatus of clause 1 wherein the air treatment chamber air inlet has an outlet port on one side of the air treatment chamber and, when the second portion is in the closed position, the wall member is provided on an opposed side of the air treatment chamber.
4. The surface cleaning apparatus of clause 3 wherein, when the second portion is in the closed position, the outlet port faces the wall member.
5. The surface cleaning apparatus of clause 1 further comprising a deformable seal member wherein, when the second portion is in the closed position, the seal member is positioned between the first and second portions and the wall member is positioned in the air treatment chamber overlying the juncture.
6. The surface cleaning apparatus of clause 1 wherein the first portion has a first abutment end and the second portion has a second abutment end, one of the first and second abutment ends comprises a U-shaped channel and the other of the first and second abutment ends is receivable in the U-shaped channel when the second portion is in the closed position, the wall portion overlies the other of the first and second abutment ends.
7. The surface cleaning apparatus of clause 6 wherein the wall portion comprises an inner portion of the U-shaped channel.
8. The surface cleaning apparatus of clause 6 further comprising a deformable seal member wherein, when the second portion is in the closed position, the seal member is positioned in the U-shaped channel.
9. The surface cleaning apparatus of clause 7 wherein the air treatment chamber air inlet directs fluid entering the air treatment chamber towards the wall member.
10. The surface cleaning apparatus of clause 7 wherein the air treatment chamber air inlet has an outlet port on one side of the air treatment chamber and, when the second portion is in the closed position, the wall member is provided on an opposed side of the air treatment chamber.
11. The surface cleaning apparatus of clause 10 wherein, when the second portion is in the closed position, the outlet port faces the wall member.

Clause Set E

1. A surface cleaning head for a surface cleaning apparatus having a front end, a rear end, an upper end and a lower end, the lower end comprising a cleaning member, a first dirty air inlet positioned forward of the cleaning member and a second dirty air inlet positioned rearward of the cleaning member.

2. The surface cleaning head of clause 1 wherein the cleaning member comprises a rotatably mounted brush.
3. The surface cleaning head of clause 2 wherein the rotatably mounted brush has a brush axis of rotation and, when the surface cleaning head is positioned on a floor with the cleaning member facing the floor, the brush axis of rotation extends horizontally and generally parallel to the front end of the surface cleaning head.
4. The surface cleaning head of clause 1 further comprising a spray nozzle directed at a location forward of the front end of the surface cleaning head.
5. The surface cleaning head of clause 2 further comprising an air turbine that is drivingly connected to the rotatably mounted brush.
6. The surface cleaning head of clause 1 further comprising a first air flow path extending downstream from the first dirty air inlet and a second air flow path extending downstream from the second dirty air inlet and a downstream portion of the first and second air flow paths merge.
7. The surface cleaning head of clause 6 wherein the surface cleaning head has a single surface cleaning head air outlet and the first and second air flow paths merge upstream of the surface cleaning head air outlet.
8. The surface cleaning head of clause 1 wherein the surface cleaning head is part of a hand vacuum cleaner.
9. The surface cleaning head of clause 1 wherein the surface cleaning head is a surface cleaning head of an upright vacuum cleaner.
10. The surface cleaning head of clause 1 wherein the cleaning member comprises a two rotatably mounted brushes, wherein each rotatably mounted brush has a brush axis of rotation and, when the surface cleaning head is positioned on a floor, the brush axis of rotation extends horizontally and generally parallel to the front end of the surface cleaning head.
11. The surface cleaning head of clause 1 further comprising a first air flow path extending downstream from the first dirty air inlet and the first air flow path includes a portion that extends over the cleaning member when the surface cleaning head is positioned on a floor with the cleaning member facing the floor.
12. The surface cleaning head of clause 11 further comprising a second air flow path extending downstream from the second dirty air inlet and a downstream portion of the first and second air flow paths merge.
13. The surface cleaning head of clause 12 wherein the surface cleaning head has a single surface cleaning head air outlet and the first and second air flow paths merge upstream of the surface cleaning head air outlet.

The invention claimed is:

1. A surface cleaning apparatus comprising:

(a) an air flow path from a dirty air inlet in a front end of the surface cleaning apparatus to a clean air outlet;

(b) a momentum separator positioned downstream of the dirty air inlet, the momentum separator comprising an outer liquid collection chamber and an inner solid collection chamber that is positioned within the outer liquid collection chamber, the inner solid collection chamber having a front side, a rear side positioned rearward of the front side and a forward-rearward axis intersecting the front side and the rear side wherein, when the surface cleaning apparatus is in a use position to clean a surface, a portion of the outer liquid collection chamber is positioned below the inner solid collection chamber; and, (c) a suction motor positioned downstream from the momentum separator, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, a portion of the inlet conduit has a conduit axis extending centrally through the portion of the inlet conduit and wherein a downstream air flow path extends from the inner solid collection chamber to the suction motor and the porous portion of the inner chamber wall connects the inner solid collection chamber in fluid communication with the downstream air flow path, and wherein, when the surface cleaning apparatus is positioned on a floor with the portion of the outer liquid collection chamber positioned below the inner solid collection chamber and the forward-rearward axis extending horizontally, the conduit axis is inclined with respect to the forward-rearward axis at a location forward of the inner solid collection chamber.

2. The surface cleaning apparatus of claim 1 wherein air travelling through the inlet conduit enters the inner solid collection chamber in a first flow direction and air exits the inner solid collection chamber in a second flow direction that is different to the first flow direction and the second flow direction is generally in an opposite direction to the first direction.

3. The surface cleaning apparatus of claim 2 wherein the second flow direction is at an angle of at least 45° to the first direction.

4. The surface cleaning apparatus of claim 1 wherein the inlet conduit has an outlet port in a wall portion of the inner wall, and air enters and air exits the inner solid collection chamber through the wall portion.

5. The surface cleaning apparatus of claim 4 wherein, in operation, water collects on a lower water collection surface of the outer liquid collection container and the outlet port is provided in an upper wall of the inner solid collection chamber and air exits the inner solid collection chamber through the upper wall.

6. The surface cleaning apparatus of claim 5 wherein the downstream air flow path comprises a downstream conduit having an inlet port that is provided on the upper wall.

7. The surface cleaning apparatus of claim 1 wherein the inner solid collection chamber is suspended inside the outer liquid collection chamber.

8. The surface cleaning apparatus of claim 1 wherein the inlet conduit extends through the outer liquid collection chamber to the inner solid collection chamber.

9. The surface cleaning apparatus of claim 1 wherein the inner wall comprises an upper wall portion, a lower wall portion and side wall portions and at least two of the wall portions comprise porous portions.

10. The surface cleaning apparatus of claim 1 wherein the inner solid collection chamber comprises a front wall that is positioned rearwardly of a front wall of the outer liquid collection chamber.

11. The surface cleaning apparatus of claim 10 wherein two side wall portions of the inner solid collection chamber are porous.

12. The surface cleaning apparatus of claim 11 wherein the suction motor has an axis of rotation and the axis of rotation intersects the inner solid collection chamber.

13. The surface cleaning apparatus of claim 10 wherein the inlet conduit extends through the outer liquid collection chamber to the inner solid collection chamber.

14. The surface cleaning apparatus of claim 13 wherein the inner solid collection chamber and the outer liquid collection chamber are separately openable.

15. The surface cleaning apparatus of claim 1 wherein the inner wall comprises a rearward portion that faces towards the suction motor and the rearward portion is water impermeable.

16. The surface cleaning apparatus of claim 1 wherein the inner solid collection chamber and the outer liquid collection chamber are separately openable.

17. The surface cleaning apparatus of claim 1 further comprising a pre-motor filter positioned downstream of the inner solid collection chamber wherein the pre-motor filter comprises a filter medium.

18. The surface cleaning apparatus of claim 17 wherein the pre-motor filter medium comprises foam.

19. A hand surface cleaning apparatus comprising:

(a) an air flow path from a dirty air inlet to a clean air outlet wherein the dirty air inlet is provided at a front end of the hand surface cleaning apparatus;

(b) a momentum separator positioned downstream of the dirty air inlet, the momentum separator comprising an outer liquid collection chamber and an inner solid collection chamber that is positioned within the outer liquid collection chamber, the inner solid collection chamber having a front side, a rear side positioned rearward of the front side and a forward-rearward axis intersecting the front side and the rear side; and, (c) a suction motor positioned downstream from the momentum separator and rearward of the dirty air inlet, wherein the inner solid collection chamber is separated from the outer liquid collection chamber by an inner chamber wall, and at least a portion of the inner chamber wall is porous and connects the inner solid collection chamber in fluid communication with the outer liquid collection chamber, and wherein the air flow path comprises an inlet conduit that extends from the dirty air inlet to the inner solid collection chamber, a portion of the inlet conduit has a conduit axis extending centrally through the portion of the inlet conduit and wherein a downstream air flow path extends from the inner solid collection chamber to the suction motor and the porous portion of the inner chamber wall connects the inner solid collection chamber in fluid communication with the downstream air flow path, and wherein the outer liquid collection chamber has a length in a forward/rearward direction, the length comprising a forward portion, a middle portion and a rear portion, and an outlet of the inlet conduit is positioned rearward of the forward portion of the length, and wherein, when the surface cleaning apparatus is positioned on a floor with a portion of the outer liquid collection chamber positioned below the inner solid collection chamber and with the forward-rearward axis extending horizontally, the conduit axis is inclined with respect to the forward-rearward axis at a location forward of the inner solid collection chamber.

20. The surface cleaning apparatus of claim 19 wherein the inner solid collection chamber and the outer liquid collection chamber are separately openable.

* * * * *